(12) United States Patent
Stinchcomb

(10) Patent No.: US 8,924,261 B2
(45) Date of Patent: Dec. 30, 2014

(54) METHOD FOR PERFORMING INTERACTIVE ONLINE SHOPPING

(75) Inventor: Matthew Stinchcomb, Brooklyn, NY (US)

(73) Assignee: Etsy, Inc., Brooklyn, NY (US)

( * ) Notice: Subject to any disclaimer, the term of this patent is extended or adjusted under 35 U.S.C. 154(b) by 160 days.

(21) Appl. No.: 12/609,355

(22) Filed: Oct. 30, 2009

(65) Prior Publication Data

US 2011/0106662 A1    May 5, 2011

(51) Int. Cl.
*G06Q 30/00* (2012.01)

(52) U.S. Cl.
USPC ........................................ 705/26.1

(58) Field of Classification Search
CPC    G06Q 30/00; G06Q 30/0641; G06Q 30/0643
USPC .................... 705/26, 27, 26.1, 27.1
See application file for complete search history.

(56) References Cited

U.S. PATENT DOCUMENTS

| | | | |
|---|---|---|---|
| 7,000,242 B1 * | 2/2006 | Haber | 725/43 |
| 2001/0044751 A1 * | 11/2001 | Pugliese et al. | 705/26 |
| 2004/0193529 A1 * | 9/2004 | Asher et al. | 705/37 |
| 2004/0225716 A1 * | 11/2004 | Shamir et al. | 709/204 |
| 2005/0251462 A1 * | 11/2005 | Nykamp | 705/27 |
| 2006/0015923 A1 * | 1/2006 | Chuah et al. | 725/135 |
| 2008/0270248 A1 * | 10/2008 | Brill | 705/26 |
| 2010/0030578 A1 * | 2/2010 | Siddique et al. | 705/3 |
| 2010/0299616 A1 * | 11/2010 | Chen et al. | 715/753 |
| 2011/0239255 A1 * | 9/2011 | Hecht et al. | 725/60 |

OTHER PUBLICATIONS

Etsy.com, Jan., Mar., Jul. 2008; Feb., Oct. 2007.*

* cited by examiner

*Primary Examiner* — Matthew Zimmerman
(74) *Attorney, Agent, or Firm* — Lando & Anastasi, LLP

(57) ABSTRACT

Disclosed herein is a method for administering a live, online, interactive shopping event. The method may comprise providing a web page on an interface of a host device through which at least one potential buyer and an event host may interact, representing the at least one potential buyer by an avatar displayed within the web page, displaying an image of an item being sold within the web page, displaying a live video stream provided by the event host within the web page, wherein the live video stream is displayed to the at least one potential buyer, and providing for the at least one potential buyer to at least one of view, discuss, and purchase the item being sold within the web page, the purchasing process being initiated by an action taken by the at least one potential buyer on the web page.

19 Claims, 20 Drawing Sheets

FIG. 1

Etsy is teaming up with X Magazine to bring you hot fall fashion picks *live* in Etsy's Virtual Labs. Hang out with X Magazine's online fashion editor, and see her top Etsy picks for autumn magically appear in the room. The "Add to Cart" button will be hard to resist.

When? Wednesday, August 12 at 5 p.m. ET. (Click here for your local time.)

Where? Etsy's Virtual Labs. *Remember the Virtual Labs only holds 150 people—so make sure you get a seat early. All you'll need to attend is an Etsy account—register here!*

Want a sneak peek? Make sure you're signed up for our Etsy Finds mailing list to get X's top fall fashion Etsy items directly to your inbox next Wednesday, August 12.

Want to share in the excitement? Join us on Twitter and tag your Shop Live tweets #EtsyLive.

P.S. See more fashionista Etsy picks from our friends at X in these Storque articles.

*FIG. 2*

Virtual Labs

Tuesday, August 11 ▶

Tuesday, August 11
4:00pm Shop Critiques

Wednesday, August 12
4:00pm Newbie Chat — *410*
5:00pm Shop Live w. X Magazine — *400*
7:00pm Quit Your Day Job Chat

Thursday, August 13
5:30pm MAD Demo—CRAFT NIGHT — *420*
9:00pm Shop Critiques Events shown in time zone: Eastern Time

*FIG. 3*

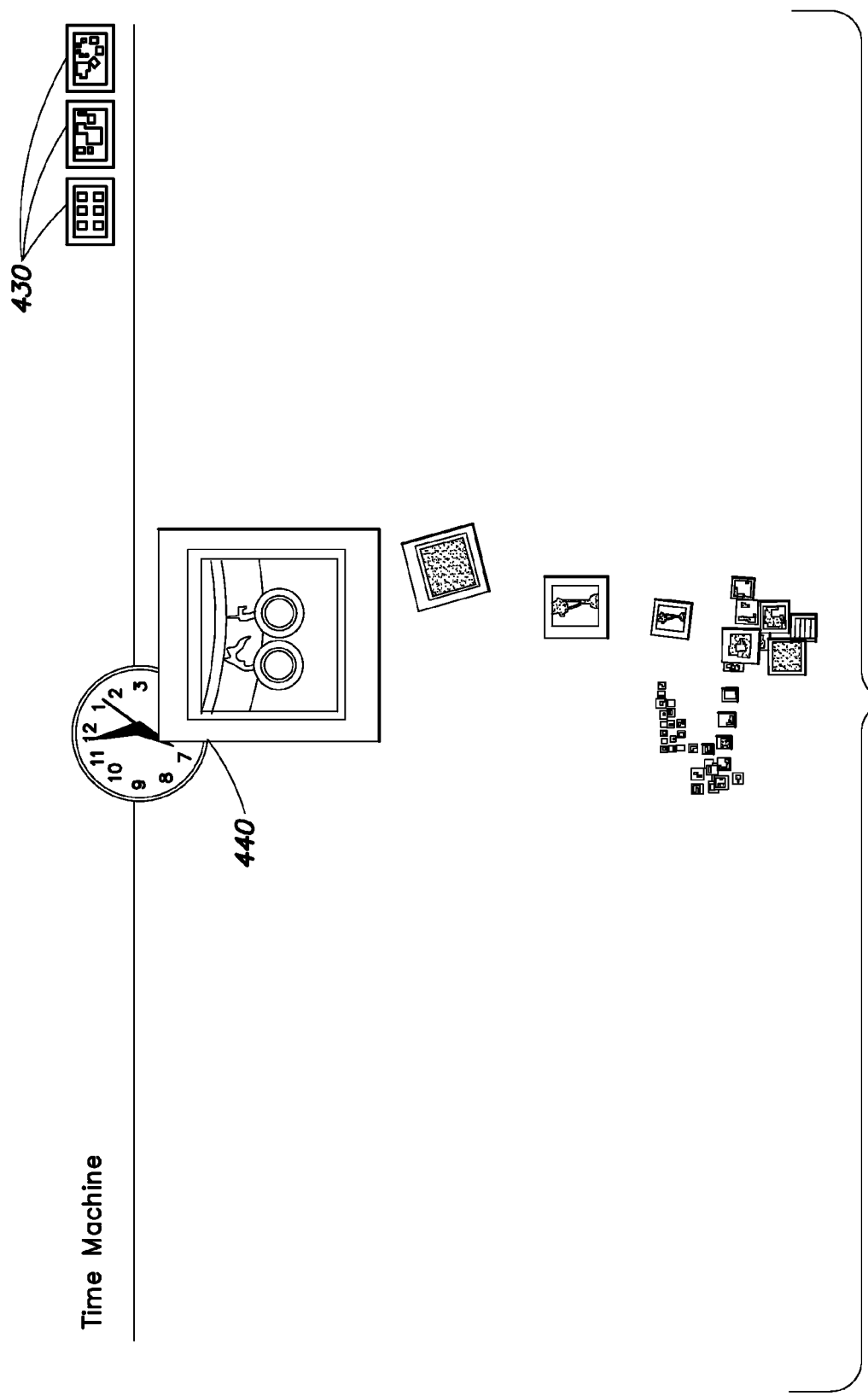

METHOD FOR PERFORMING INTERACTIVE ONLINE SHOPPING

BACKGROUND OF INVENTION

1. Field of Invention

Embodiments of the present disclosure are related to online communities where goods may be sold.

2. Discussion of Related Art

On-line shopping, or e-commerce, has in recent years become a popular way for consumers to shop for goods. Examples of popular consumer oriented e-commerce web sites include the well-known eBay® and Amazon.com® web sites as well as various shopping sites dedicated to goods from a particular vendor, for example the web sites of Dell, Inc., of Round Rock, Tex., or of Crutchfield, Inc., of Charlottesville, Va. These e-commerce sites typically provide for little interaction between vendors and potential buyers aside from the ability to e-mail questions from a shopper to a vendor. Further, it is appreciated that these e-commerce sites do not provide for real-time interaction between potential buyers.

Other e-commerce web sites, including those associated with organizations such as QVC, Inc., of West Chester, Pa., and the Home Shopping Network, Inc., of St. Petersburg, Fla., provide videos of people selling products and links to purchase said products. For example, a web site associated with QVC, Inc. permits potential buyers who are accessing the web site to send text messages that may be relayed to a person in a video selling the product. These text messages, however, are not displayed on the web site for other potential buyers to view. These e-commerce web sites also do not provide for real-time interaction between potential buyers.

SUMMARY OF INVENTION

Embodiments of the present disclosure are related to systems and methods for providing an on-line shopping experience involving real-time interaction among buyers and shopping event hosts. Embodiments provide for buyers and event hosts to participate in shopping events including live video of a host or moderator promoting one or more items in an online environment, with additional features providing for real-time interaction between buyers, and between event hosts and buyers.

While participating in a live online shopping experience according to certain embodiments disclosed herein, buyers may chat with other buyers and/or post comments regarding an item or items being offered for sale. Buyers may also chat with or send messages to an event host during a live online shopping experience. In addition, an event host may poll buyers participating in an online shopping experience to get the opinions of the buyers on topics for which the host may desire feedback.

According to various embodiments, the online shopping events may take place within an online community in which members may set up online stores to promote and sell various items. The online community may provide members with resources such as articles, educational forums and presentations, chat rooms, and bulletin boards which members may access or participate in. Within this online community, members may communicate with other members, share ideas, participate in contests, and/or access how-to guides to learn how to enhance their online stores and increase sales. Members may also be provided the opportunity to join together into teams to share ideas and resources and/or cross promote each other's online stores.

In accordance with one aspect, there is provided a method of administering a live, online, interactive shopping event. The method may comprise presenting a web page on an interface of a host device, the web page providing for at least one potential buyer and an event host to interact, representing the at least one potential buyer by an avatar displayed within the web page, displaying an image of an item being sold within the web page, displaying a live video stream provided by the event host within the web page, wherein the live video stream is displayed to the at least one potential buyer, and providing for the at least one potential buyer to at least one of discuss and purchase the item being sold within the web page, the purchasing process being initiated by an action taken by the at least one potential buyer on the web page.

The method may further comprise providing for the at least one potential buyer to interact in real time with the event host. The at least one potential buyer may be provided with the ability to text chat with the event host. Content of the text chat may be displayed within the web page.

In accordance with another embodiment, the method further comprises providing for an avatar associated with the at least one potential buyer to perform an action under the control of the at least one potential buyer.

In another embodiment, the method may further comprise providing for the at least one potential buyer to interact in real time with at least one other potential buyer within the web page. The at least one potential buyer may be provided with the ability to send a private message to the at least one other potential buyer from within the web page. The at least one potential buyer may be provided with the ability to virtually throw a virtual item at the at least one other potential buyer.

In another embodiment, the method may further comprise providing the event host with the ability to limit interaction between the potential buyers.

In another embodiment, the method may further comprise providing for the at least one potential buyer to access an online store of at least one other potential buyer by clicking on an avatar of the at least one other potential buyer.

In another embodiment, the method may further comprise providing virtual seats within the web page in which the avatar of the at least one potential buyer may sit.

In another embodiment, the method may further comprise providing for an event host to present a poll to the at least one potential buyer. Results of the poll may be presented in real time within the web page to the at least one potential buyer.

In another embodiment, the method may further comprise providing for the at least one potential buyer to indicate to at least one of the event host and at least one other potential buyer that the at least one potential buyer is leaving the shopping event. The at least one potential buyer may be provided with the ability to reserve a space in the shopping event to which the at least one potential buyer may have the option of returning to after leaving the shopping event.

In accordance with another aspect, there is provided a method of administering an online community. The method may comprise providing for a host device to communicate over a communications medium with a server, the server including information defining aspects of the online community, providing for a set of web pages included within the online community to be displayed on an interface of the host device, providing for members of the online community to create online stores through which they may display and sell items to other members of the online community, providing for the assignment by an administrator of the online community of moderator status to at least one of a member of the online community and a guest host, and providing for the moderator to present a live streaming video presentation of them self promoting at least one item from at least one online store to at least one member of the online community through an interface of the host device.

In another embodiment, the method may further comprise providing for one or more members of the online community to view the live streaming video presentation by entering a workshop room presented within a web page associated with the online community. Members who have entered the workshop room may interact with one another through avatars associated with the members.

The method may further comprise providing for a member to link their community account to a social networking web site wherein activity of the member within the community is displayed on the social networking web site.

In another embodiment, the method may further comprise providing for a member of the online community to schedule a time at which a live, interactive online event will occur. At least one of a member and a host of the interactive event may insert an image of an item onto a web page upon which the interactive event is displayed for other members to see.

In another embodiment, the method may further comprise assigning an avatar to a member of the online community.

In another embodiment, the method may further comprise providing for a member of the online community to click on an image of the at least one item during the live streaming video presentation. Information regarding the at least one item may be displayed in response to the member clicking on the image.

In another embodiment, the method may further comprise providing for members of the online community to post questions to a question queue accessible by the moderator. The moderator may respond to a posted question, and the response may be accessible by the at least one member of the online community to whom the live streaming video presentation is presented.

In another embodiment, the method may further comprise providing for the moderator to remove a member of the online community from the workshop room. The moderator may also prevent members of the online community from entering the workshop room. The moderator may alter an appearance of a virtual workshop room in which the live streaming video presentation is presented.

In another embodiment, the moderator may record a transcript of the live streaming video presentation. Members of the online community may access the transcript through an interface of the host device at a time after the live streaming video presentation has been performed.

In accordance with another aspect, there is provided a system for administering a live, online, interactive shopping event. The system comprises a host device including a display configured to present a web page to a buyer, a camera configured to capture a live audio/video stream of an event host promoting an item from an online store of a member of an online community, and a computer server configured to transmit the live audio/video stream through a network to be displayed on the web page, configured to display an avatar of the buyer on the web page, configured to display at least one image of the item being promoted by the event host on the web page, and configured to provide real-time interaction between the buyer and the event host.

In accordance with an embodiment of the system, the computer server is configured to provide for the buyer to purchase the item being promoted within the web page.

In accordance with another embodiment of the system, the host device includes an interface configured to provide for the buyer to perform an action initiating a purchasing process for the item being promoted in the web page.

In accordance with another embodiment of the system, the computer server is configured to provide real-time interaction between the buyer and at least one other buyer through the web page.

In accordance with another embodiment of the system, the computer server is configured to provide for the buyer to virtually throw an item at least one of the at least one other buyer and the event host.

In accordance with another embodiment of the system, the computer server is configured to provide for the buyer and the at least one other buyer to text chat within the web page.

In accordance with another embodiment of the system, the computer server is configured to provide for the event host to limit the interaction between the buyer and at least one other buyer.

In accordance with another embodiment of the system, the computer server is configured to provide for the event host to respond in real time to a question presented by the buyer within the web page.

In accordance with another embodiment of the system, the computer server is configured to provide for the event host and the buyer to text chat within the web page, the content of the text chat viewable by at least one other buyer within the web page.

In accordance with another embodiment of the system, the host device includes an interface configured to provide for the buyer to control an action of the avatar of the buyer.

In accordance with another embodiment of the system, the computer server is configured to provide for the buyer to access an online store of at least one other buyer by selecting an avatar of the at least one other buyer.

In accordance with another embodiment of the system, the computer server is configured to provide for the event host to present a poll to the buyer within the web page.

In accordance with another embodiment of the system, the computer server is configured to present results of the poll in real time within the web page.

In accordance with another embodiment of the system, the computer server is configured to provide for the event host to remove the avatar of the buyer from the web page.

In accordance with another embodiment of the system, the computer server is configured to provide for the event host to record a transcript of at least one of the live audio/video stream and chat text posted within the web site during the shopping event.

In accordance with another embodiment of the system, the computer server is configured to provide for the buyer to select an image and to display the image within the web page.

In accordance with another embodiment of the system, the computer server is configured to provide for the buyer to navigate away from the web page while reserving a spot within the web page for the buyer to return to.

In accordance with another aspect, there is provided a computer readable medium encoded with computer-readable signals which define instructions that, as a result of being executed on a computer system, instruct the computer system to present a web page on an interface of a host device, the web page providing for at least one potential buyer and an event host to interact, represent the at least one potential buyer by an avatar displayed within the web page, display an image of an item being promoted within the web page, display a live video stream provided by the event host within the web page, wherein the live video stream is displayed to the at least one potential buyer, and provide for the at least one potential buyer to purchase the item being sold within the web page, the purchasing process being initiated by an action taken by the at least one potential buyer on the web page.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 1 is an example of a portion of a web page for an online community in accordance with various embodiments of the present disclosure;

FIG. 2 is an example of a portion of a web page for an online community according to one embodiment announcing an upcoming online interactive shopping event referred to hereinafter as a "Shop Live" event as described more fully below;

FIG. 3 is an example of a portion of a web page for an online community announcing multiple upcoming community events;

FIG. 15C illustrates a portion of a web page listing items sold by members of the online community according to another embodiment;

DETAILED DESCRIPTION

Figure 4:
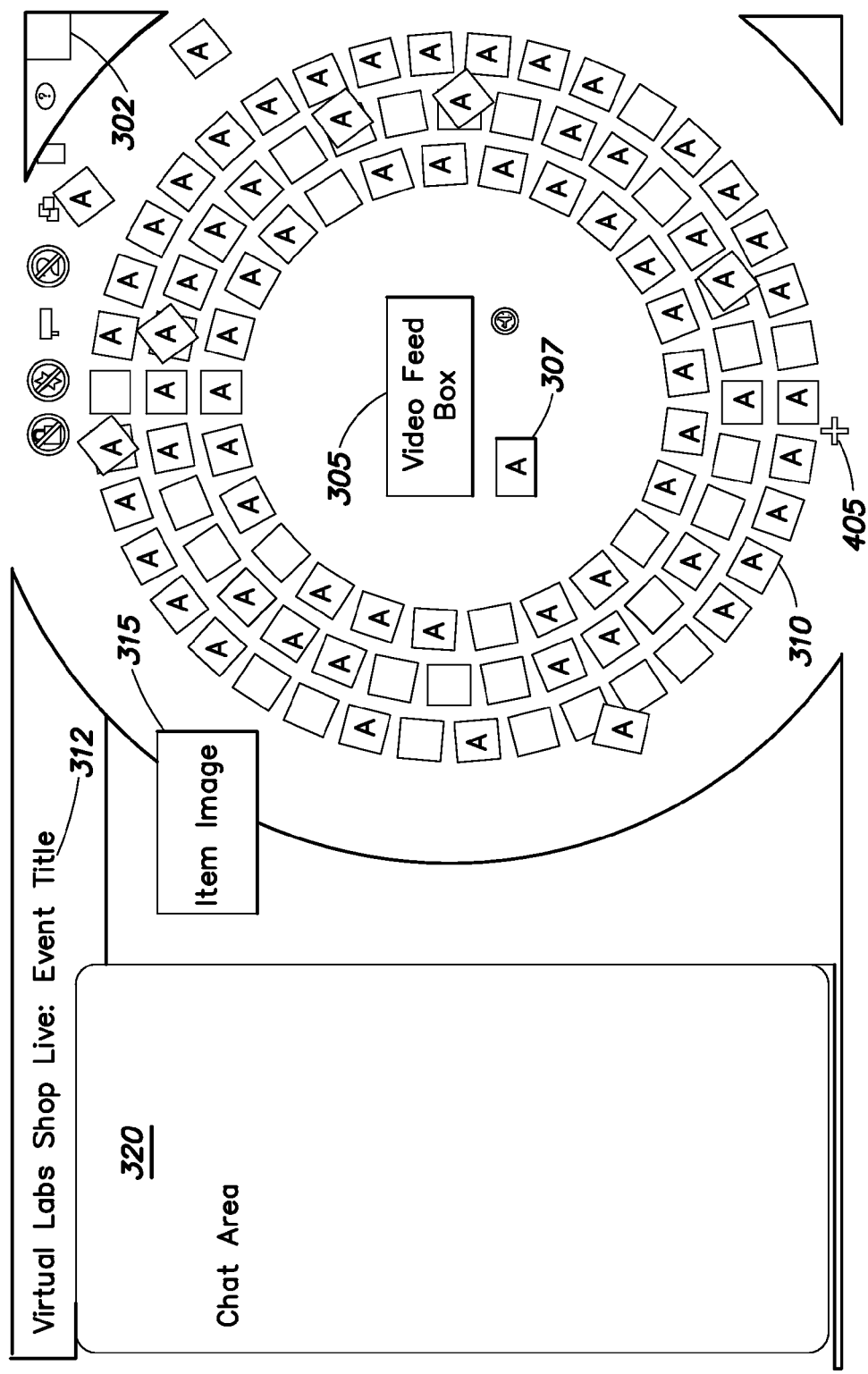
FIG. 4 illustrates an example portion of a web page used to perform a transaction in association with embodiments of an online interactive shopping event system described more fully below according to one embodiment.

The aspects disclosed herein, which are consistent with principles of the present invention, are not limited in their application to the details of construction and the arrangement of components set forth in the following description or illustrated in the drawings. These aspects are capable of assuming other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

This invention is not limited in its application to the details of construction and the arrangement of components set forth in the following description or illustrated in the drawings. Aspects of the invention are capable of other embodiments and of being practiced or of being carried out in various ways. Also, phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Disclosed herein are various systems and methods for hosting and administering a multi-user, multimedia online community. Members of the online community may interact with one another, post and access articles, videos, or other information, sell and purchase items from online stores, attend shopping events featuring live streaming audio/video presentations, and perform real-time interaction between members of the online community and event hosts.

According to various embodiments, online stores accessible through the online community may be owned and operated by members of the online community. According to some embodiments, owners of the online stores may participate as event hosts in shopping events featuring live streaming audio/video presentations and real-time interaction between buyers and event hosts. In some embodiments, the shopping event hosts may promote items from online stores other than and/or in addition to their own, and/or may promote items being sold by other members. In some embodiments, guest hosts who are not owners of online stores within the online community may host online interactive shopping events and promote items sold by members of the online community.

In some embodiments, online stores and shopping events accessible through web sites that support the online community are designed for and dedicated to the sale of unique, handmade goods, such as handmade clothing, jewelry, and other crafts. The focus on handmade goods within the online community may provide the online community a particular character and make it attractive to people who enjoy producing and/or buying or selling handmade goods. Because members of the online community may share a common interest in handmade items, members of the online community may feel that they are participating in an online experience with others of like minds, which may facilitate creating a community-like feeling among members of the online community. In alternate embodiments, online stores associated with the online community may offer for sale items that are not necessarily handmade, for example, supplies used to make handmade items and vintage items, or items which otherwise relate or are complimentary to handmade items.

Some embodiments of the present disclosure are related to a virtual shopping experience using avatars and specific GUI aspects as described more fully below. Other embodiments relate to a role-based live online shopping experience that is conducted using a group meeting format.

According to some implementations, the online community may include forums where members can ask questions, report bugs, and discuss various aspects of the online community. The community may also include entities referred to herein as "Virtual Lab" events where members may participate in, for example, workshops, meetings, and online classes. Such events may include presentations provided via live streaming video from one or more moderators or hosts. Some Virtual Lab events may provide users the opportunity to interact in real time with other members and purchase goods promoted by these other members. Some Virtual Lab events may be limited as to the amount of people who may participate. Limiting the amount of people who may participate in an event may help prevent a host of an event from being overwhelmed with more questions from participants than he is able to answer. Limiting the amount of people who may participate in an event may also help prevent a computer system upon which software associated with the event is being run from becoming overloaded and decreasing response speed for the members attending the event.

The online community may also include chat rooms where members can virtually meet and chat. These chat rooms may be public chat rooms, private chat rooms, or both.

In other implementations, members of the community may be able to join teams comprising members who may be united by common interests, crafts, or locations. Teams may comprise organized groups of members who network, share skills, and promote their online shops together. Members may join teams to give or receive assistance from other team members, or simply to become part of a sub-community of like-minded individuals with whom they may interact.

Further, web pages within the online community may provide listings of teams and their profile pages as well as information about how to join an existing team or start a new team. In other examples, web pages within the online community may also provide tips and guides on running an effective team, marketing and promoting a team, internet resources for teams, downloadable promotional materials for a team's events, tools for enhancing a team's web presence, or provide other resources for enhancing team performance. The online community may provide workshops for team members, and in some instances or embodiments, just team leaders, to share ideas and insights about running and marketing a successful team. Transcripts of past workshops may be made available through an archive area in the online community. Members may view these transcripts to see what they missed in, for example, an educational workshop that they were unable to attend. A schedule of upcoming workshops may also be available through a web page associated with the online community.

Further, the community may provide an online location for news and/or articles (in print or video form) related to the community and/or related to the interests of community members and may provide the ability for news to be e-mailed directly to members. How-to articles or videos may also be provided. There may also be a resources area within the online community where a member may be provided tools for helping promote their online store.

In some embodiments, the online community may provide information about contests to be held within the online community in which members may compete.

In some embodiments, the online community may also provide for members to join together to work on collaborative projects.

Figure 1:
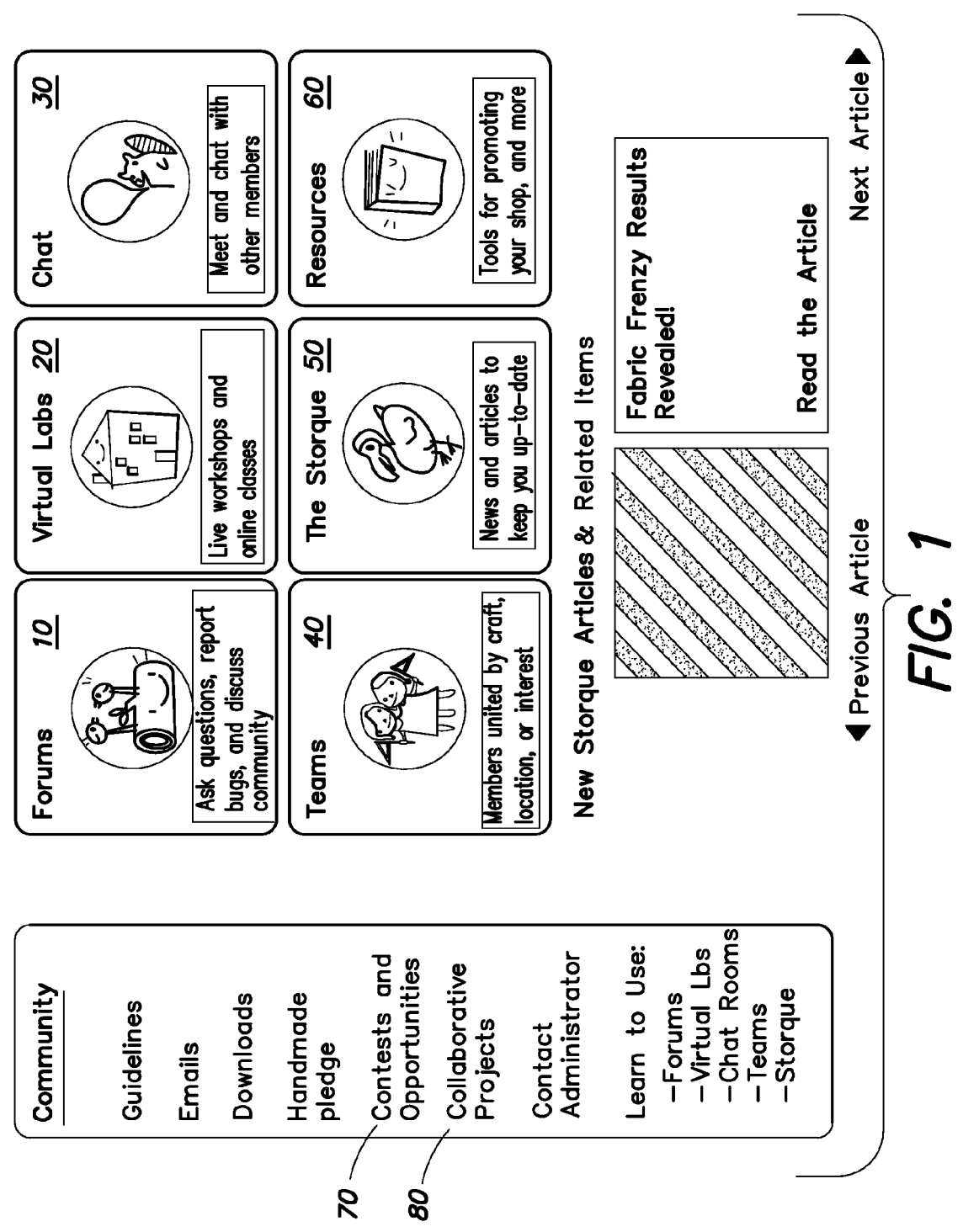

FIG. 1 illustrates a portion of a web page including links through which members may gain access to various functions within the online community. For example, there may be links (e.g., links 10-80) that are selectable within the interface that when selected by a user (e.g., an online community member), permit the user to perform one or more functions within the online community. Through the example web page illustrated in FIG. 1, a member of the online community may gain access to Forums 10, Virtual Labs 20, Chat 30, Teams 40, "The Storque" 50, Resources 60, Contests and Opportunities 70, and Collaborative Projects 80 areas on various web pages associated with the online community. A member may gain access to these areas of the online community by mouse clicking within the boxes 10-60, or the links 70 or 80, respectively. These links may be included within a "Community" page hub web site for the online community.

In one example, by selecting the Forums link 10, the online system may bring a community member to a message board web site where members may post, read, and respond to discussion threads regarding various topics. Discussion threads within the Forums message boards may include, for example, announcements from the administrators of the web community and/or help topics where members may post questions to the community on how to use various features of the community web sites. Discussion areas may be provided where members may give and receive critiques or suggestions regarding their online store. A suggestion area may be provided where members may post suggestions for improving the online community. A bug reporting section may be provided where members may report errors they may have encountered while using the various web sites comprising the online community.

When a member selects the Virtual Labs link 20, the online system may bring a community member to a web page listing various upcoming events, such as live shopping events or educational presentations that are scheduled to occur. This web page may also provide links which a member may select to join one of these events as a participant.

When a member selects the Chat link 30, the online system may bring a community member to a web page listing various chat rooms that are currently active. A group of avatars representing members present in various active chat rooms may be listed under a title of a chat room. A member may select a link to join an active chat room and join a discussion that is ongoing in that chat room. Alternatively, a member may be provided with an opportunity to create a new chat room and invite other members to join the created chat room. Members may have to ability to specify that a chat room is private, and may restrict the members that may join the chat room by, for example, setting a password that is required to be entered to gain access to the private chat room and communicating this password only to members whom are to be granted access to the private chat room.

When a member selects the Teams link 40, the online system may bring a member to a web page including a listing of all the teams in the online community and links to their profile pages. The Teams web page may also include information about how to join an existing team or start a new team, tips and guides on running an effective team and/or for marketing and promoting a team, internet resources for a team, and downloadable promotional materials for a team's events and for enhancing a team's web presence. The Teams web page may also include a listing of upcoming workshop events that are directed toward running and marketing a successful team, as well as links to join these workshops. Transcripts of past workshops may be accessed through the Teams web page.

When a member selects the Storque link 50, the online system may bring a member to a web page, which may be similar to a blog, including a listing of articles and/or presentations created by community members, administrators, or guest authors regarding topics of interest to the online community. These articles may include, for example, reviews of various members' stores, how-to guides, and articles updating members on technical issues associated with any of the community web sites. One or more articles or presentations may be in the form of a video presentation. The Storque web site may also include a Showcase section where items from members' online stores may be promoted.

When a member selects the Resources link 60, the online system may bring a member to a web page including downloadable images and/or banners that a member may download and incorporate into the member's online shop or use to modify their avatar in order to, for example, announce a sale that is happening in their online shop. The Resources web page may also include links to web sites such as currency convertors or how-to articles.

When a member selects the Contests and Opportunities link 70, the online system may bring a member to a web page including announcements of upcoming promotions or contests, for example contests where members may submit videos related to a particular type of craft. Results from previous contests may also be provided on this web page.

When a member selects the Collaborative Projects link 80, the online system may bring a member to a web page including descriptions of various community projects. The community projects may include, for example, descriptions and links to contests such as those listed in the Contests and Opportunities web site, or announcements, descriptions, and links to educational forums, such as those listed in the Virtual Labs web page.

The above description and illustration of the web page in FIG. 1 is only an example and should not be considered limiting. A Community page hub web site of the online community may be formatted in a different manner than illustrated and may include different and/or additional features and links than described above. For example, the Community page hub web site may include items such as a member's choice gift guide, a schedule of upcoming community events, a listing of handpicked items from various members' online stores, and community updates. A Community page hub web site may also include links to web pages associated with the online community on other web sites, such as Twitter, Facebook, MySpace, Flickr, or YouTube.

In some embodiments, in order to gain access to one or more of the above described areas of the online community, a person may be required to first register as a member of the online community. A person may register to become a member of the community by selecting a "Register" link which may be provided in one or more of the community web pages, for example in a home page associated with the online community. Prospective members may be required to provide a valid e-mail address, a unique username, and a password.

In some embodiments, members may also be given the option of indicating their geographic location, which may be displayed on an online map accessible by members of the community. A member may desire to indicate his or her geographical location because as a seller of goods, if the member enters a location and/or indicates the member's location on the map, the member's shop may be included in "Geolocator" and/or "Shop Local" search features of the online community which allow potential customers to identify merchants within a certain geographical area. Further, buyers often like to know where an item will ship from when shopping. Identifying a member's geographical location can also be helpful when joining a team because some teams may be built from members from within a certain geographical location.

A member can position a marker indicating their location on the map in at least two ways. A first way is for a member to enter the member's location in a City text field, and then press a "look up" button. The member may need to include more information, such as a state or country, if the member lives in a city with a common name, like Manchester. The member may also interact directly with the online map. In some embodiments, a member may zoom in or out and move around the map by using virtual buttons on the map itself. A member may click on the map to place an icon representing the member's location.

According to one embodiment, a username chosen by a member may be used as a unique identifier. A username chosen by a member who wishes to become a seller within the online community may also be used for the seller's shop name. By naming the shop name with the seller's username, potential buyers may more easily determine to whom a particular online shop belongs. This capability may permit, for example, a shopper to send a shop owner a message with a question related to an item for sale in the shop.

If a community member wants to be a seller, the member may be required to provide a valid credit card number. This credit card number may be used to pay the fees associated with, for example, listing and selling items in the seller's online shop.

In some embodiments, all buyers and sellers may be required to be over the age of 18 who can form legally binding contracts under applicable law, or be able to demonstrate that they have permission and supervision from a parent or legal guardian who can form legally binding contracts, in order to register as members of the online community.

A member who is a seller, or who wishes to promote various items which can be found for sale within the online community, may schedule a time at which to hold a live interactive shopping event. In some embodiments, members must be granted permission by an administrator of the online community before being permitted to schedule such an event. Other members of the online community may find information about upcoming shopping events on a web page within the online community, for example within a homepage of the Virtual Labs area of the community. An example of a live interactive shopping event announcement is illustrated by a portion of a web site, indicated generally at 200, illustrated in FIG. 2. This announcement may include links to web pages relevant to the announcement (shown in FIG. 2 in alternate font).

In some embodiments, the online community may include one or more Virtual Labs. The Virtual Labs may include multimedia chat rooms where members may virtually gather for discussions, meetings, educational forums, shopping events, or for other community events. Administrators, or event hosts or moderators, may use the Virtual Labs to hold interactive workshops which other members of the online community may attend, such as seminars on marketing or real-time shop critiques. As illustrated in FIG. 3, the Virtual Labs may offer "Shop Live" events 400, described in more detail below, as well as scheduled chats on particular topics 410, or demonstrations 420 of various products or methods of making different types of craft items.

Scheduled Virtual Lab events may be announced in the online community's super-blog, which may in some embodiments be named the "Storque." The Storque may provide information and announcements for buyers and sellers about the online community and the handmade lifestyle. Articles accessible through the Storque may be written or recorded by staff, special guests, and/or members of the community. The Storque may be updated several times daily with new content. Readers may leave comments and pitch ideas for new articles within the Storque.

According to one embodiment, Virtual Labs may be found in a Community section of the online community. The homepage of the Virtual Labs may be a lobby or landing page where members can find information about, and join in on upcoming and current workshops. The homepage of the Virtual Labs may display various rooms in which workshops may be held, which a member may enter by selecting a room. A "Back" button 302 (illustrated in FIGS. 4 and 5) may be provided within the rooms of the Virtual Labs which a member may select to exit the room.

Inside the Virtual Labs of the community, a member may appear by his or her avatar. An avatar adds a visual element to a member's identity, complementing his or her username. A member may choose an avatar by clicking an avatar browse button and locating an image file on the member's computer to use as an avatar. The image file may be a digital photograph. In some embodiments, the avatar may be represented as a square image, and thus the original image used to create the avatar should be square, otherwise there may be distortion. A member may use a variety of image manipulation applications, such as the Adobe Photoshop® application or GIMP application, to adjust an image for use as an avatar. If a member does not choose an avatar, a default avatar may be assigned to the member. The default avatar may be an image of the first letter of the member's username (e.g. the avatar "C" illustrated in FIG. 5). An avatar of a member may appear when a member posts in Forums, joins in chat rooms, attends Virtual Lab events, or enters various other places throughout the web sites comprising the online community.

The online community may include multiple methods of providing interaction between members. One of these may be known as a "Conversations" feature. The Conversations feature may comprise an intra-community messaging system wherein members may communicate with other members. The Conversations feature may be utilized in obtaining information prior to a potential transaction. In some embodiments, members may access a Conversations area of the online community to send or receive messages generated within the online community. Members may set their preferences to receive an e-mail notification at an e-mail account external to the online community (e.g. on Yahoo or Hotmail), every time they get a new Conversation.

Workshops may be held within the Virtual Labs, where members may chat or attend presentations related to subjects of interest to the members. Some Virtual Labs may comprise a web page including a number of squares representing seats. The provision of squares representing seats within the web page may give the web page an appearance similar to that of a classroom or a theater, with members' avatars seated to view a presentation by another member, an administrator, a moderator, or a guest host. In some embodiments, upon joining a workshop, a member may choose a square for the member's avatar to sit in. Members may chat via text with other members and share item/product images with the group of members in the Virtual Lab workshop room. The ability of members to chat and share images of items for sale in the online community with one another may be controlled by a host, an administrator, or a moderator of the workshop event. The Virtual Labs may provide features which allow member to change chat text colors and font sizes, virtually "throw" a variety of items (sometime referred to as gifting an item), spin an avatar, and/or virtually raise a hand to ask a question or wave to a friend.

An administrator, host, or moderator of a Virtual Lab event may appear via webcam (including audio and video feeds) which may be streamed in real time. In some embodiments, the host may have the ability to poll the audience and the audience may have the ability to vote by selecting responses provided in a poll window to share opinions.

Members may interact with other members in a Virtual Lab workshop environment in a number of ways. A member may mouse click on another member's avatar to bring up a web page or window illustrating that member's shop or profile. A member may also post a public message to all members in the Virtual Lab or send a private message (e.g. "whisper") to another member while in a Virtual Lab workshop.

In some embodiments, the Virtual Labs may include "Shop Live" areas and/or provide for the performance of "Shop Live" events. Shop Live events are online shopping events having live, interactive shopping features. Shop Live events may provide an administrator, a guest curator, or event host the opportunity to broadcast live via webcam, including audio and video, to an audience and share their favorite items or present items for sale in real time. During the event, members may watch the webcam audio/video stream, text chat, ask questions of the administrator, guest curator, or event host via text, purchase items, take part in polls, and utilize other Virtual Labs features. In some embodiments, a feature may be provided to archive the text chat and record Virtual Labs events so that members can view the event at a later time. In some embodiments, Shop Live events may include corporate sponsorship or other forms of monetization.

A member attending a Shop Live or other workshop event within the Virtual Labs may be able to perform various actions which may depend upon a status assigned to that member. For example, members may be assigned a status of a regular member, a Moderator/Host, or as an Administrator (Admin).

In some embodiments, actions that may be performed by all members of the online community within Virtual Labs workshop rooms, regardless of status, may include any or all of the following:

Access audio and video feeds
    View messages posted to chat box
    View private messages
    View images of items placed in room
    View room seating and layout
    View other users' avatars, admin avatars, host avatars, and moderator avatars (where applicable)
    View a schedule of workshop events
    View a room's title and description
    Choose a seat for their avatar to occupy In some embodiments, actions that may be performed by regular members within Virtual Labs workshop rooms may include any or all of the following:

Whisper (i.e. send a private message) to another member, moderator, or admin
    See whispers (private message) directed to that member
    Throw an item at (a.k.a. give a gift to) another member within the room
    Change a currently active item that may be thrown or given as a gift Post messages to a chat box
Clear messages from a personal chat box
Change the size or color of their chat text which appears in the chat box
Enter and leave the room
Make their avatar spin
Make their avatar display clapping animation
Mute personal video and/or audio settings
Send a question to a question queue for a moderator, host, or admin
Add images of items to the room
Set self as away from the room
Set self as back in the room
Say an action note (posts a comment in the chat box when a member uses an action command for their avatar, i.e. "Daniellexo shakes her head.")
Change the displayed room color
Answer a poll or vote on a question In some embodiments, actions that may be performed by administrators, moderators, or event hosts within Virtual Labs workshop rooms may include those which may be performed by regular members plus any or all of the following:

Choose to poll members, choose the subject of the poll, and poll the members in the room and show results of the poll including who voted and for what
Choose an anonymous vote subject
Ask the members to perform an anonymous vote and show results of the vote
Change the title and/or topic of the room
Change the font size of the room topic
Change the room description
Change a background image in the room
Create a new chair in the center of the room
Remove all chairs from the room
Create a room portal (an entrance where members may enter the room)
Clear a portal (a Virtual Lab workshop room may have multiple portals, i.e. places where an avatar may appear when entering a room. A moderator may delete or "clear" any or all of these portals)
Clear all item listings
Control the ability for members in the room to chat
Disallow conversation between members in the room
See whispers (private message) directed to the admin or moderator
Change the room color displayed to all members in the room
Kick a member out of the room (appears to members that person was removed)
Hard kick a member out of the room (appears to members that person simply left)
View a list of members in the room
Allow or disallow members to post listings in the room
Allow or disallow gift giving (the throwing of items)
Collect questions from members in a queue
Lock and unlock the doors of the room to allow or disallow members from entering
Move items in the room
Delete items from the room
Control the use of host or moderator's webcams or microphones in the room
Drag members' avatars to locations in the room
Change the seating layout of the room
Clear messages in the chat box for all members
Show a current server time
Control the creation of transcripts of the workshop event
Record a transcript of the session (in HTML or text)
Stop recording the transcript In some embodiments, a moderator may not destroy a room, view rooms attributes for debugging, or give themselves or anyone else moderator status. A moderator's status may be granted by an administrator for a temporary time period and may expire at the end of that time period.

In some embodiments, actions that may be performed by Administrators within Virtual Labs workshops may include those which may be performed by moderators, event hosts, or regular members plus any or all of the following:

Make other members Moderators or revoke a member's Moderator status
Destroy a room
View a room's attributes for debugging purposes
An administrator's administrator status may not expire Illustrated in FIGS. 4-9 are examples of portions of web pages depicting virtual workshop rooms that may be utilized by members during Shop Live events to interact with each other and with event moderators, administrators, or hosts (who may be community members or guests) by, for example, live audio/video feeds, text chat, and/or through their actions performed by their avatars. During a Shop Live event, an event moderator, administrator, or host may broadcast audio and video live via webcam or other form of audiovisual transmission device to a number of members represented by avatars 310.

In FIGS. 4-9, member avatars are represented by the letter "A," however it should be understood that members' avatars may be unique to each member, and may in some embodiments comprise digital pictures of the members or some other identifying images. A video portion of a broadcast may appear in a video feed box 305. A representation of a host's avatar may appear proximate the video feed box 305 in a host avatar box 307. A host may also present a live video feed via webcam or otherwise of one or more items which members attending the event may choose to discuss, comment on, or purchase. Images 315 of the one or more items presented may in some embodiments be static digital photographs.

A seller avatar may be included in a box 317 may be appended to an image 315 of an item being promoted. The provision of a seller's avatar appended to an image of an item may allow for members in a workshop room to identify the seller of the item displayed.

A title of a Shop Live event may be presented in the web site. An event title is represented in FIGS. 4-6 and 8 by the term "Event Title" 312, however, it should be understood that a title that is descriptive of the Shop Live event, including for, example the name of a guest curator or sponsor, or of a theme for the event may be illustrated.

Figure 5:
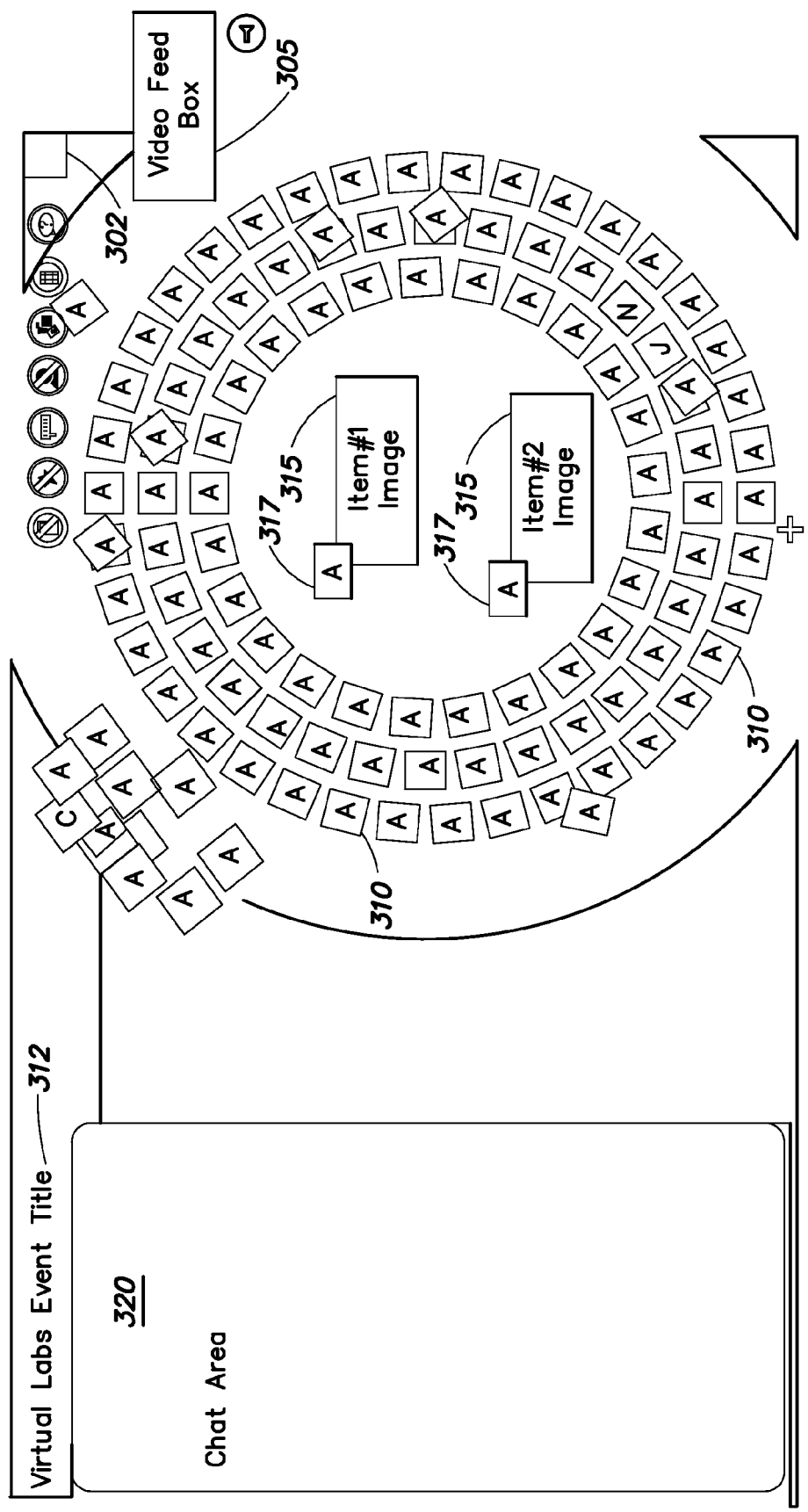
FIG. 5 illustrates another example portion of a web page for performing a transaction according to one embodiment.
Figure 6:
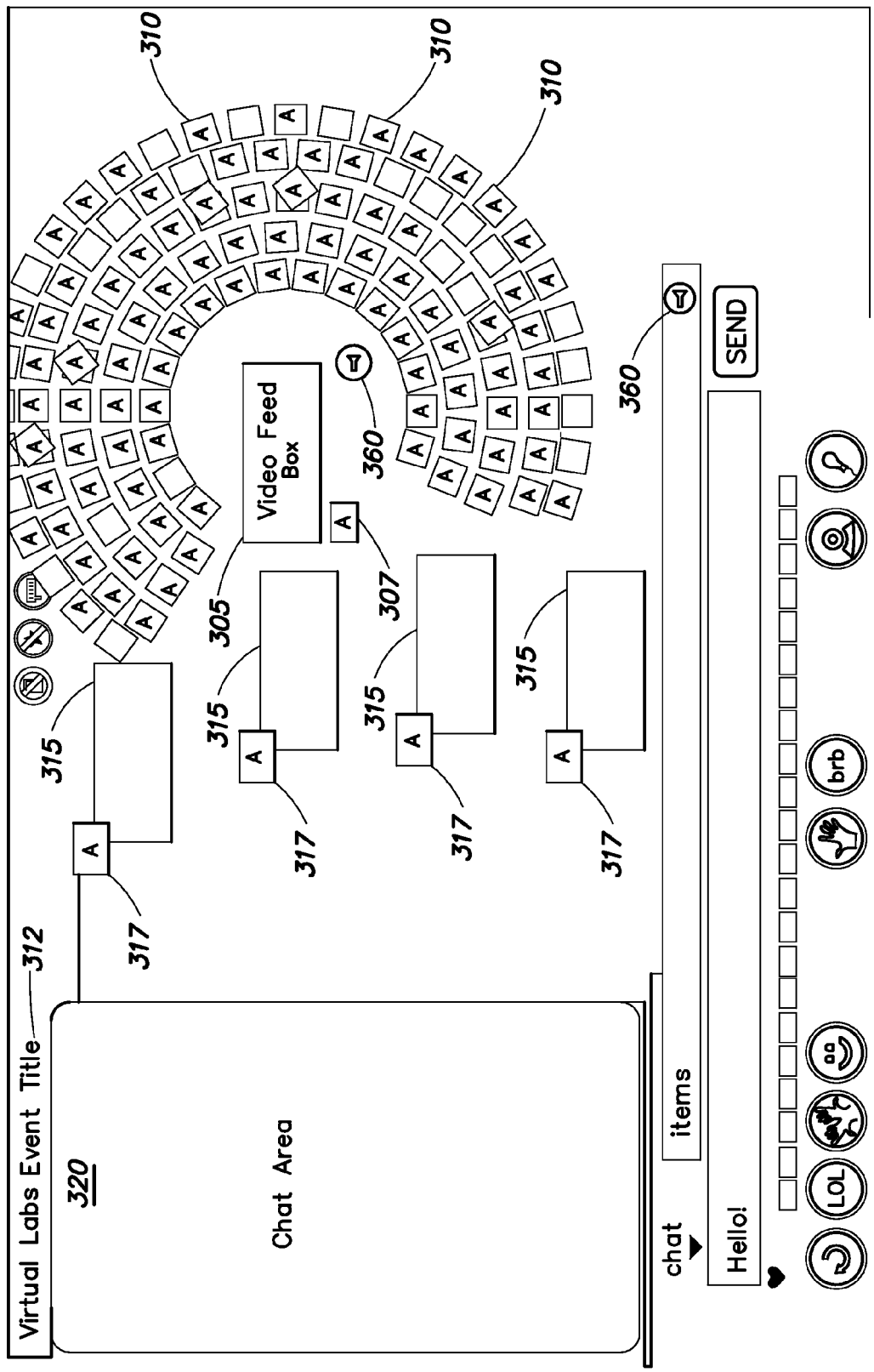
FIG. 6 illustrates another example portion of a web page for performing a transaction according to another embodiment.

As illustrated in FIGS. 5 and 6, a host may display multiple item images 315 at the same time. Each of the images 315 may be of a different item. Alternatively, each of the images 315 may be different images of the same item. A chat area 320 may also be provided for members, host(s), and/or administrator(s) to communicate via text. The provision of an area to display text chat may be useful if a potential buyer would like to request additional details about some aspect of an item being presented.

In some embodiments, upon entering a Shop Live event or Virtual Lab workshop, a member may see his or her avatar appear within the virtual room represented on the web site. Mouse clicking anywhere within the room may allow the member to move his or her avatar around. If the room has designated squares, clicking one of the squares may cause the avatar to take a seat in that square in the workshop. Members may identify other members by their avatars. If a member recognizes another member, for example, by the member's avatar within the room, the member may wish to say "hello" or initiate a chat with the other member. The number of avatars present at a Shop Live event may provide an event host with an indication of buyer interest in the particular product(s) being promoted in the event.

Figure 7:
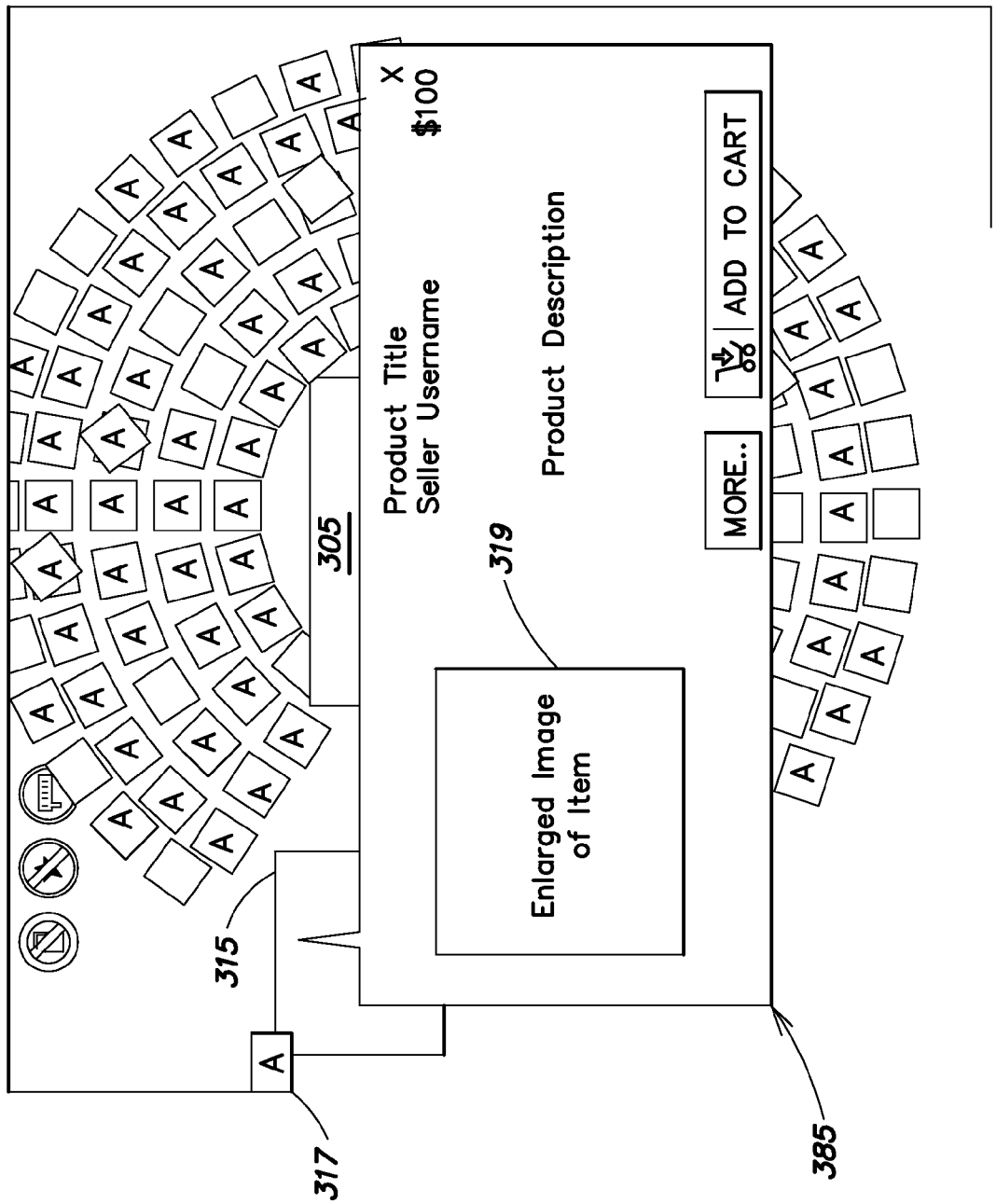
FIG. 7 illustrates another example portion of a web page for performing a transaction according to another embodiment.

In some embodiments, during a Shop Live event, members may be provided with the ability to select an image 315 of an item they are interested in, for example, by mouse clicking on the image 315. This may bring up a window 385, as illustrated in FIG. 7, showing an enlarged view 319 of the item, a product description, a price for the item, and/or a link to add the item to the member's purchase cart for purchasing. These additional details may help the potential buyer decide whether or not to purchase the item in question.

In some embodiments, event administrators, moderators, or hosts (referred to collectively here as an event host) may be provided with an ability to poll buyers participating in the Shop Live event. The host may ask a question that appears in a window such as that indicated at 390 in FIG. 8, which also may include buttons which members participating in the event may select to indicate their response to the question posed. A graphical indicator, such as a pie chart, may indicate in real time the number of participants who have responded to the poll question and how they responded. The poll window 390 may also indicate the number of participants in the Shop Live event who have yet to respond, and/or a time remaining for participants to enter a response. The polls may allow a host to obtain feedback from potential buyers on what they like or do not like about an item being promoted. This feedback may provide a seller of the item with information on how to improve on the item, or on what other types of items might be desired so that the seller may make changes to his or her inventory of items to better cater to buyer demand. The polls may also provide participants the opportunity to express an opinion or to simply have fun.

In some embodiments, a member may find out more information about other members in the room by mouse clicking or by otherwise selecting their avatars. This may bring up a window, such as that indicated at 395 in FIG. 9, with may include options to click on a link to the member's shop or profile, send them a conversation, or to send a private message without leaving the workshop.

Figure 10:
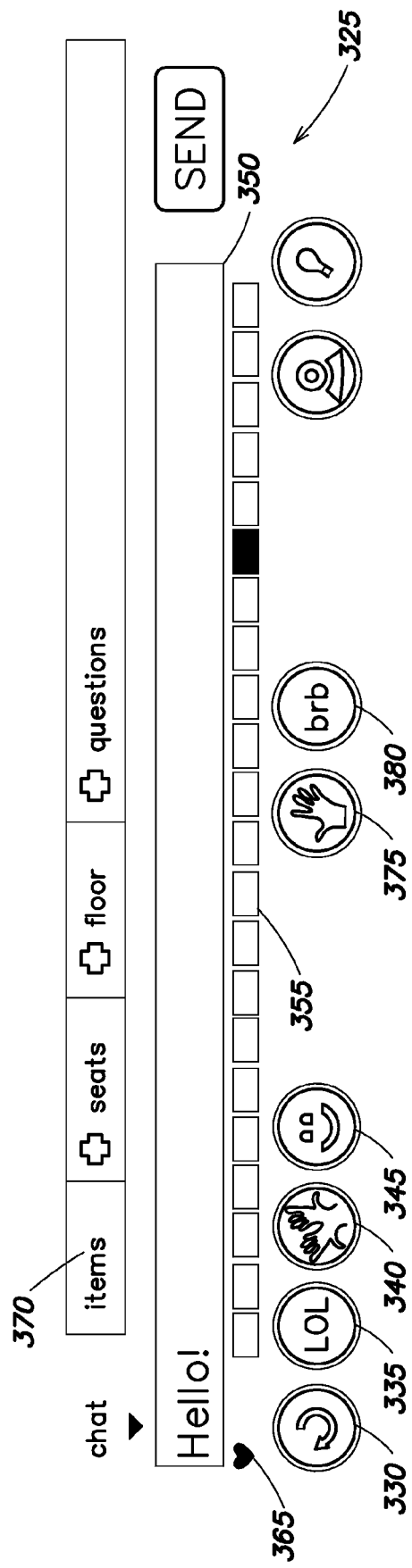
FIG. 10 illustrates a control panel through which a user may chat or control various actions for an avatar within the online community.
Figure 11:
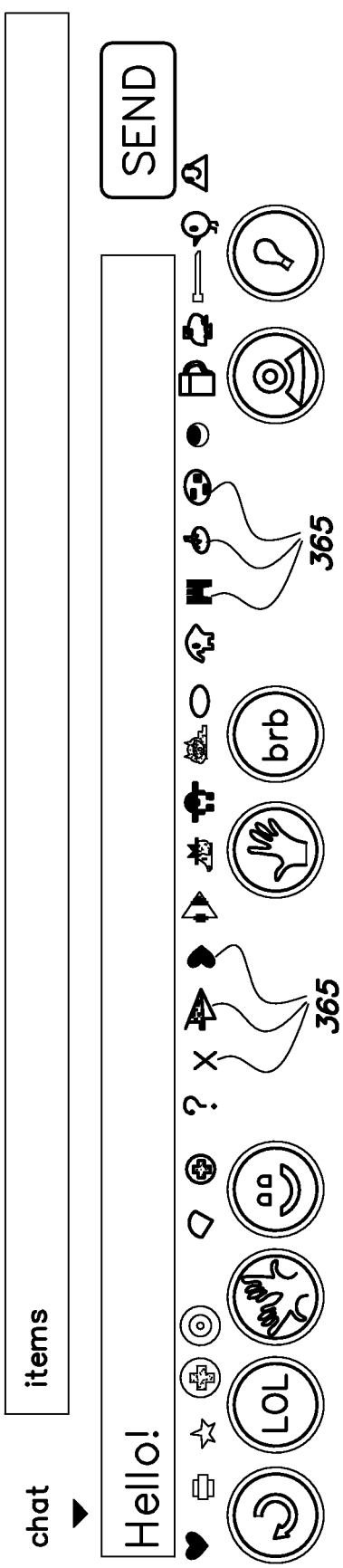
FIG. 11 illustrates an alternate configuration of the control panel of FIG. 10.

In some embodiments, while participating in Shop Live or workshop events in a Virtual labs workshop room as shown in FIGS. 4-9, members may chat with other members by entering text into a chat text field and/or cause their avatars to perform certain actions by utilizing a control bar such as that illustrated in FIGS. 10 and 11. To make an avatar spin, bounce, beat, or glow, a member may select one of the four control buttons 330, 335, 340, and 345, respectively, located underneath the chat text field 350. For a member to virtually raise the member's avatar's hand like the member is asking a question, or waving, the member may select the control button 375 with the hand on it. The selection of the control button 375 by a member may in some embodiments put an image of a raised hand over the member's avatar in the workshop. For a member to change the color of his or her chat text, he or she could select the desired color in a color bar 355 underneath the chat text field 350. In some embodiments, as the member passes a mouse cursor over the colors, they will appear brighter (a brightened color choice is represented by the darkened color choice box illustrated in FIG. 10). To turn the sound on or off in the workshop room, a member may select a button 360 (indicated in FIG. 6) with a megaphone icon.

In some embodiments, to "throw" an item (otherwise known as to gift an item) in a Shop Live or workshop event, a member may select his or her avatar and while holding down a mouse button, pull back off the avatar like a slingshot aimed at the direction for the item to be thrown. When the member lets go of the mouse button, the item may be released and thrown. To change the image of the item that the member may throw, the member may select a small image 365 located directly under the chat text field 350, illustrated in FIG. 10. Selection of the image 365 may open up a list of different items 365, as illustrated in FIG. 11, wherein six of the items in a row of 26 items which a member may choose to throw are indicated by the designators 365. Selecting any of the 26 items 365 in the row of items may make the chosen item the new item that may be thrown. In different embodiments, different, more, or fewer items may be available for a member to choose to throw than are illustrated in FIG. 11. Items may be thrown to indicate approval or disapproval of different products, members, or events which are present or occur within a Shop Live or workshop event. An event host or administrator may allow or disallow the throwing of items during a workshop or Shop Live event.

In some embodiments, members attending workshop events may also have the ability to communicate with other members using images. To insert an image, for example a picture of an item, into a workshop for other members to see, a member may select the "items" tab 370 above the chat bar illustrated in FIG. 10. The member may type or paste in an item number associated with a picture of an item located on the network and hit enter. The member would then see the item appear in the workshop. A member may wish to display such images to help explain or give an example of something during, for example, an educational seminar, or may wish to display such images to get feedback from other members on an item which the member is considering offering for sale. Administrators and event hosts may allow or disallow members to post item images within the workshop and may have the ability to clear posted images from the workshop room.

In some embodiments, a member may indicate that he or she is temporarily leaving a Virtual Lab workshop but will be returning by selecting a control button 380 that is marked "brb." Selecting this button may lighten the color of the member's avatar to indicate that the member is not currently present, but the member's spot in the workshop is reserved. A member may wish to utilize this feature if the member is attending an event with a limited number of allowed participants, but wishes to temporarily leave the event to, for example, check on another event, access an online store, or purchase an item that was illustrated in the Virtual Lab workshop or Shop Live event.

Additional control buttons may be provided in other embodiments to allow a member to cause the member's avatar to perform additional actions.

Figure 12:
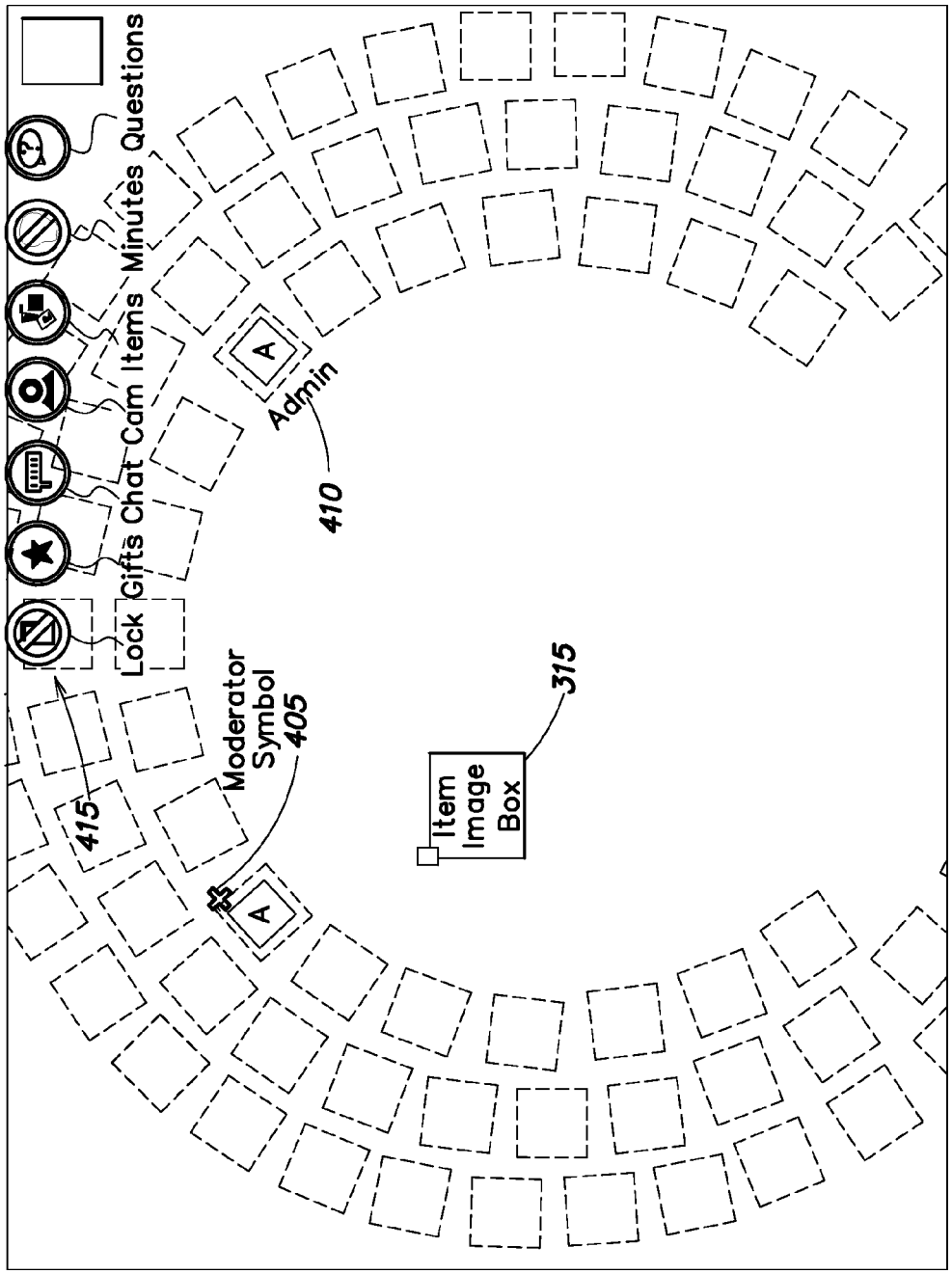
FIG. 12 illustrates another example portion of a web page for performing a transaction according to another embodiment.

In some embodiments, avatars for moderators (hosts) and/or administrators may be illustrated in a workshop room during a Shop Live event. The administrator and/or moderator's avatars may be designated with a moderator symbol 405, or an administrator symbol 410, as illustrated in FIG. 12. The identification of the avatars belonging to an event moderator/host or administrator may facilitate the ability of members attending the event to mouse click or otherwise select the avatar of the moderator/host or administrator to, for example, send them a private message or question.

Control buttons 415 which may allow an event moderator/host or administrator to perform actions in a workshop room may be present in the room. Some or all of the control buttons 415 may only be activated by a moderator, host, or administrator. The control buttons 415, may, for example, provide for a moderator, host, or administrator to allow or disallow the throwing of items or the posting of item images in the workshop room. The control buttons 415 may also provide for a moderator, host, or administrator to allow or disallow text chat among members in the workshop room, and/or to turn on or off the recording of a transcript of the conversations and chat occurring in the workshop room.

Figure 13:
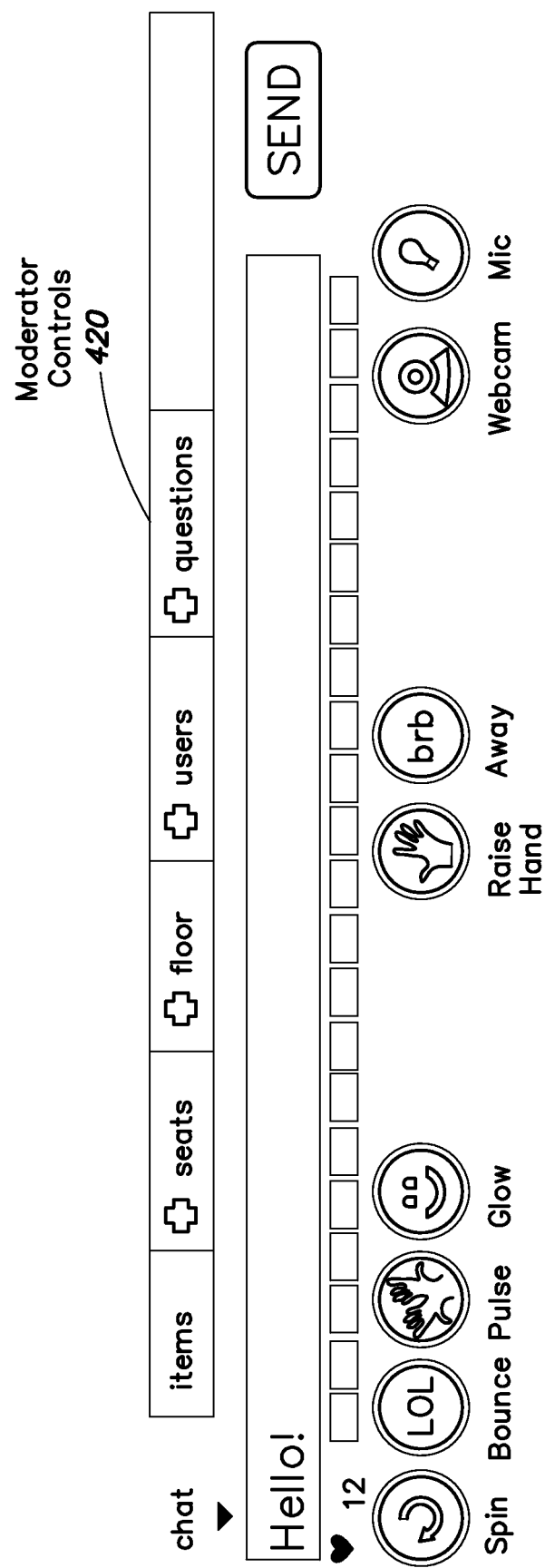
FIG. 13 illustrates a control panel which may be accessed by an event moderator in a web page for performing a transaction according to another embodiment.
Figure 14:
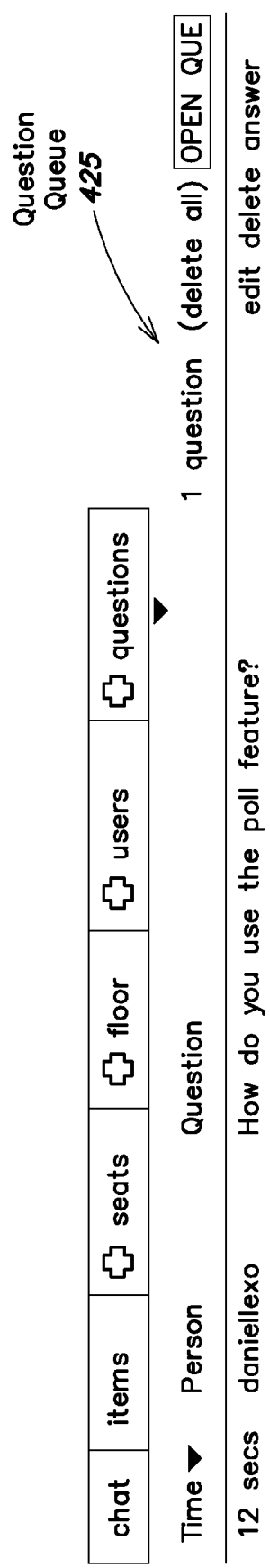
FIG. 14 illustrates the control panel of FIG. 13 wherein a questions tab is opened to reveal a questions queue.

In some embodiments, additional controls 420, as illustrated in FIG. 13, which may be utilized by an event host, moderator, or administrator may be provided. The controls 420 may allow for the host, moderator, or administrator to perform functions such as rearranging the seats within the workshop room, kicking a member or members out of the room, or accessing a list of questions which have been submitted by members attending the event. FIG. 14 illustrates a question queue 425 that may be accessed by an event moderator, host, or administrator. The question queue may list questions, the username of the member who submitted the question, and an amount of time that had elapsed since the question was posted. The event moderator, host, or administrator may have the option to answer questions in the queue by posting an answer that is viewable to all members participating in the event, if they feel the question is directed to something all in the room might wish to know. The event moderator, host, or administrator may send a private message to a member in response to a posted question if the answer is particular to the member that posted a question, or may ignore or delete a question from the queue if the question is inappropriate.

It should be appreciated that the various controls and web site designs described above should not be considered limiting. Changes to the appearance of these controls and to the web page layouts as well as the addition of subtraction of controls or other features within the example web pages illustrated may be made without departing from the scope of the present disclosure.

In some embodiments, mechanisms other than online stores or Shop Live events may be provided through which members may promote, buy, or sell goods. For example, members may place items for sale on a "Showcase" section of the community. A Showcase is an area for the display of items for sale which is associated with a paid advertising program for member shops. Sellers may purchase a spot to promote their items within a Showcase. There may be different kinds of Showcases available.

In some embodiments, a "Main Showcase" (a.k.a. a Homepage Showcase) may be linked from the front page of the community home page and feature items from a limited number, for example, 36 sellers daily. A "Storque Showcase" may be linked from the Storque blog's front page and feature items from a limited number, for example, 25 sellers daily. Additionally, there may be "Category Showcases" which in some embodiments may be displayed as a ticker at the top of a main page for each category of items offered for sale. The Category Showcases may feature items from a limited number, for example, 25 sellers daily, selected by the seller from their listings in that category.

Different Showcases may have different levels of exposure for items placed in the different Showcases. For example, more members may see an item listed on the Main Showcase than on a particular Category Showcase. Accordingly, members may pay different fees for featuring their products on these different Showcases. For example, it may be more expensive to place an item on the Main Showcase than on a Category Showcase. Showcases may display items for only a limited amount of time, after which a member may pay an additional fee to add their item back to a Showcase. Showcase fees may be used to contribute operating funds for the maintenance of the community web site or compensation for administrators and operators of the web site.

Members may shop for items in the on-line stores of other members using various search methods. In some embodiments, the online community may include a search utility that provides for members to search for items by category, for example, for items in categories such as Accessories, including such sub-categories as apron, belt, case, charm, cozy, cuff, cuff links, eyewear, gloves, hair, hat, keychain, lanyard, leg warmers, mirror, mittens, money clip, necktie, patch, pin, pinback button, scarf, shawl, wallet, and watch, or a category such as Housewares, including such sub-categories as basket, bathroom, bedroom, bowl, cleaning, clock, coaster, cozy, fixture, frame, home decor, kitchen, lighting, magnet, office, outdoor, pillow, rug, serving, sign, table, vase, wall decal, and wall décor. In some embodiments, categories may be assigned to items using a method of dynamic categorization as described in co-pending U.S. patent application Ser. No. 11/828,797, entitled "SYSTEM AND METHOD FOR DYNAMIC CATEGORIZATION" which is hereby incorporated by reference herein in its entirety.

Members may also access or be provided with shopping features that provide for them to shop from among hand-picked featured items from other members, from items chosen as "Editor's picks," items from featured sellers, from items available for purchase from shops that have just sold an item, or from undiscovered shops waiting for their first sale. A gift guide may also be available on a web site associated with the community to assist members in choosing gifts.

In some embodiments, members may choose to shop from members in a specific geographic location, and may search for such members' shops using search features known as, for example, "Geolocator" or "Shop Local."

In some embodiments, members may shop by choosing a color and searching for items matching that color, as described in co-pending U.S. patent application Ser. No. 11/834,175, entitled "SYSTEM AND METHOD OF SHOPPING BY COLOR" which is hereby incorporated by reference herein in its entirety.

In additional embodiments, members may find items by viewing a list of items that other members (either a group of members or a specific member) have expressed interest in. This method of search may help a potential buyer identify items that are more popular than others.

Figure 15A:
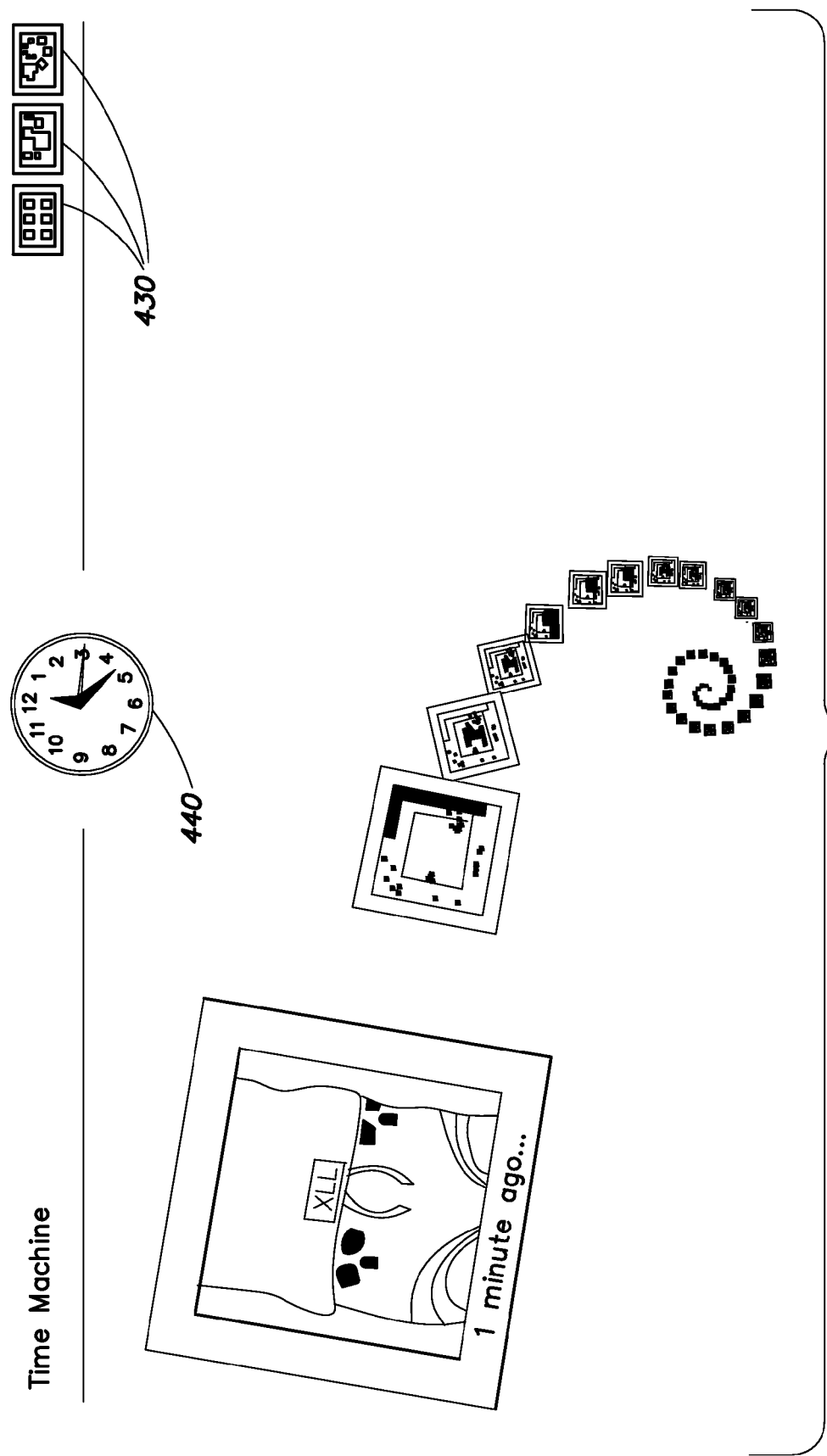
FIG. 15A illustrates a portion of a web page listing items sold by members of the online community according to one embodiment.
Figure 15B:
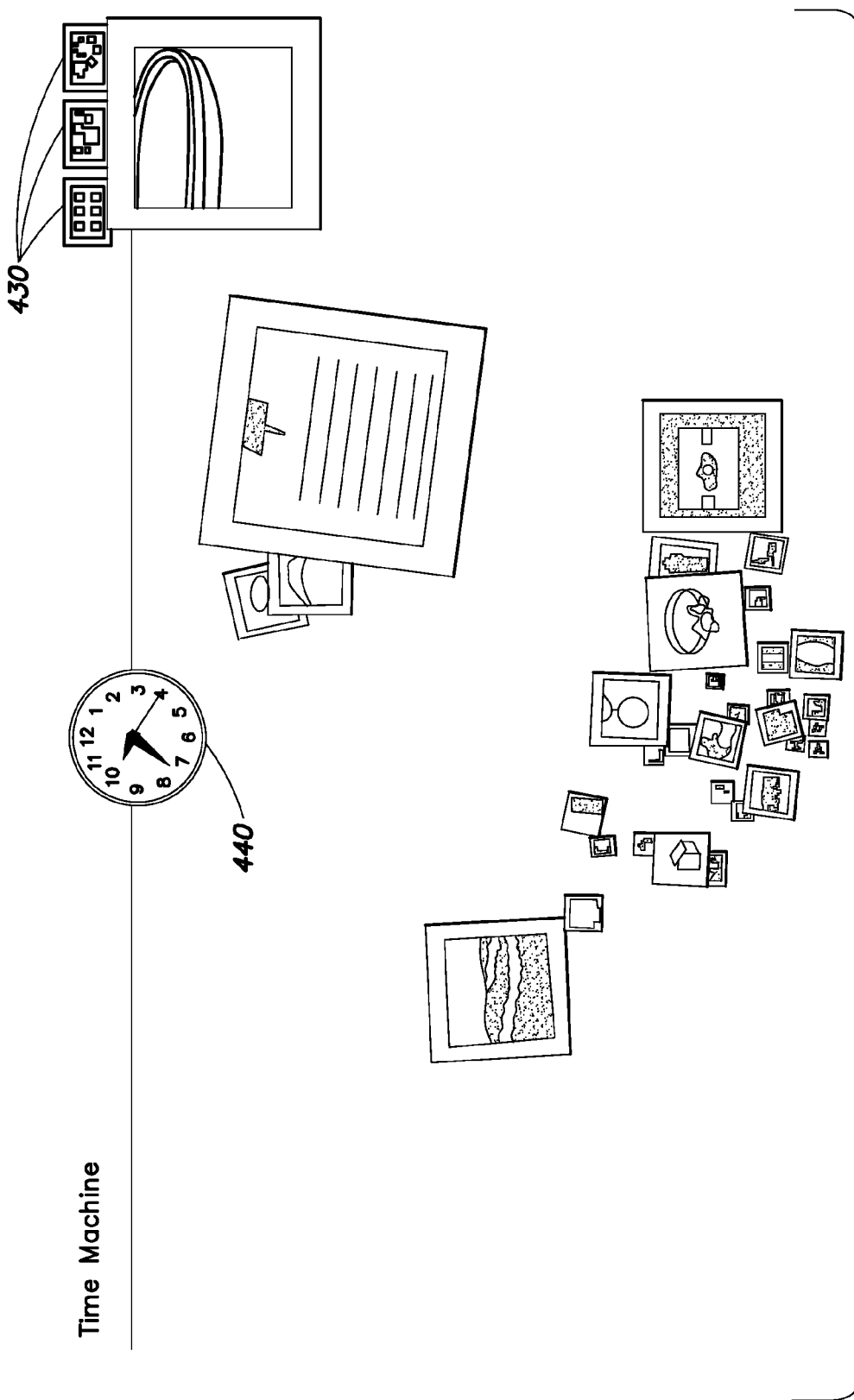
FIG. 15B illustrates a portion of a web page listing items sold by members of the online community according to another embodiment.
Figure 16:
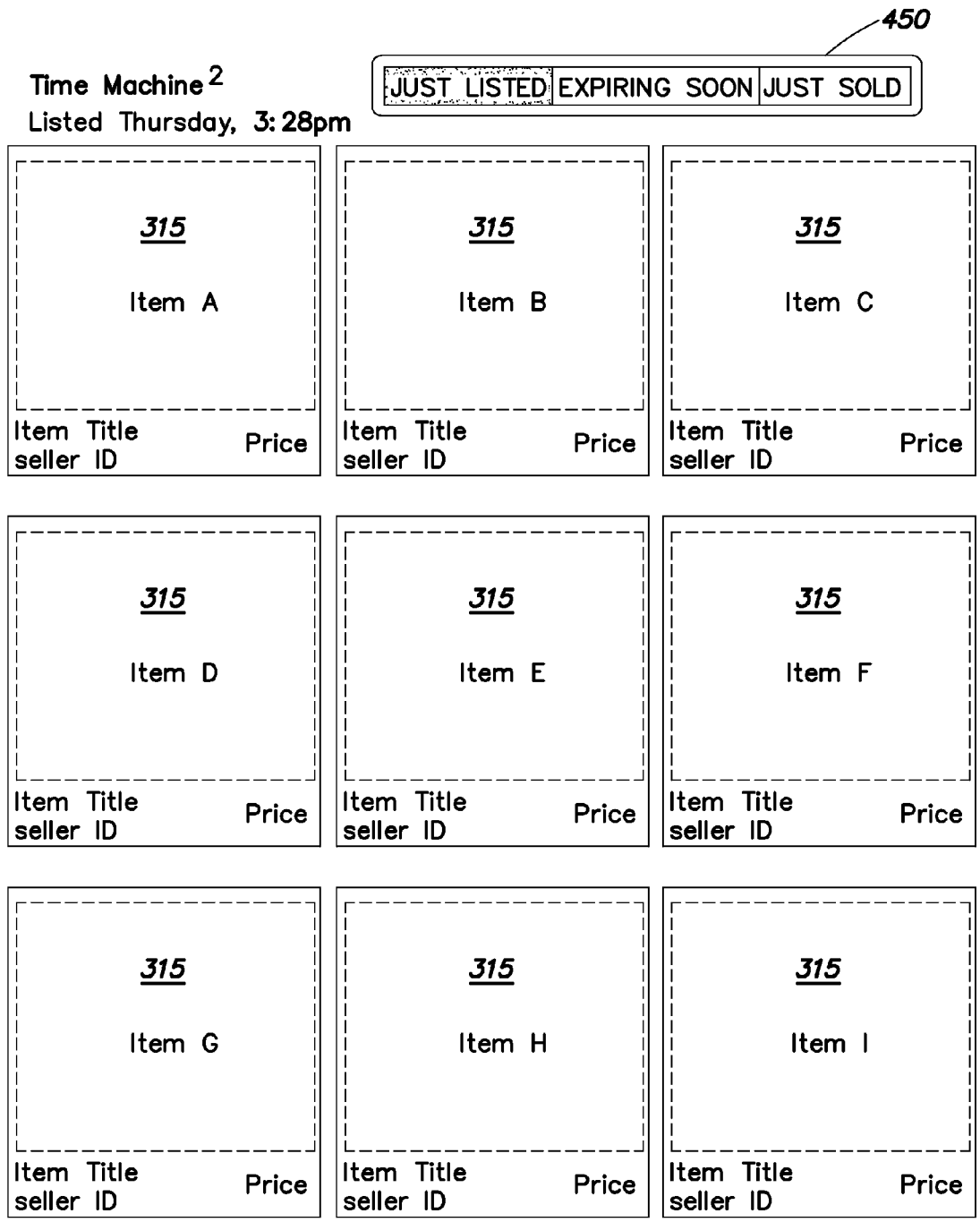
FIG. 16 illustrates a portion of a web page listing items just listed for sale by members of the online community according to another embodiment.

In some embodiments, the online community may have a feature for displaying items based on the time they were listed in a member's store or based on a time they were sold, known as a "Time Machine." The Time Machine may display recently listed items flying through time and space in multiple different configurations. FIGS. 15A, 15B, and 15C illustrate embodiments of three different configurations of the Time Machine selectable using configuration buttons 430. The Time Machine may also include a representation of a clock 440 indicating the time that the foremost item displayed was listed or sold. A member may adjust the clock 440 to show items listed at various times using, for example, a scroll wheel of a computer mouse. The representations of the items in the Time Machine interface may be labeled with the time that elapsed since they were listed or sold. In another embodiment, the Time Machine may display items on a grid and may allow members to select from different viewing modes including, for example, Just Listed, Expiring Soon, and Just Sold according to a selection of buttons 450 (FIG. 16).

In some embodiments, to help buyers find the items that other members are selling, the sellers may associate tags with their items. The selling member may be provided with the option to associate tags with an item when listing the item for sale, or may have the option to modify the tags associated with an item at a later time. Tags are keywords that may be used to sort items. The first tag on an item may determine a top-level category it is listed under. Subcategories may also be based on tags. For example, a drawing subcategory inside Art may show items tagged with the tags "Art" and "drawing." A single tag may be comprised of multiple words, e.g. "Bath and Beauty." A member may associate multiple tags with an item, for example, up to 14 tags per item.

In some embodiments, a member may associate Materials keywords or tags with their items. Materials tags are a special kind of tag. Instead of helping members understand what an item is or what it is used for, Materials keywords or tags help members determine what an item is made out of. Members may click a Materials keyword or tag anywhere they see it within a web page of the online community to be taken to a list of all other items using the same material. A member may associate multiple Materials tags per item, for example, up to 14 Materials tags per item. Materials tags may be useful because some buyers may be interested in purchasing items made of a certain material, for example wicker, to match other items made of the same or similar materials which they already own.

The online community may provide members with item search features which allow a member to search by any one or more of item description, keyword, category, tag, or other parameters.

In some embodiments, members may be charged fees by the administrators or operators of the online community for listing items for sale in their online shops. A single listing payment may allow a member to keep an item posted for a limited time period. If the item is not sold within this time period, the item may expire or the member may choose re-list the item and pay another listing fee. In some embodiments, listing fees may be less than a dollar, for example, 20 cents per item listed. The listing fees may, in other embodiments, be higher than a dollar per item listed. In some embodiments, payment of a listing fee will allow an item to be displayed for a time greater than a month, for example four months. In other embodiments, payment of a listing fee will allow an item to be displayed for a time less than a month, for example, a week. A listing fee may be based in part on the asking price of the item to be sold. A listing fee may be determined in part based upon a desired time period for which a seller wishes an item to be displayed. In some embodiments, listing fee discounts may apply to the listing of multiple items. Listing fees may be used to contribute operating funds for the maintenance of the community web site or compensation for administrators and operators of the web site.

In some embodiments, members may also be charged a fee upon the sale of an item from their store. This sales fee may be determined based at least in part on the selling price of the item sold. In some embodiments, the sales fee may be a percentage of the selling price of the item sold. The sales fee may be less than 10% of the selling price of the item sold, for example 3.5% or 1% of the price of the item sold. The selling price used to determine the sales fee may or may not include shipping costs. Like listing fees, sales fees may be used to contribute operating funds for the maintenance of the community web site or compensation for administrators and operators of the web site.

In some embodiments, upon completing a transaction with another member, members may leave a feedback rating of positive or negative, a comment, and/or a "Customer Appreciation Photo," and/or a feedback comment in a customer feedback area of the online community. A member's feedback score may be the cumulative total of all positives (+1) and negatives (−1) that a member has received. In some embodiments, feedback may only be left within a certain time period, for example 90 days, after a transaction is completed. A mechanism may be provided for members to change negative or neutral feedback if an issue has been resolved. When a member chooses to initiate an offer to change negative or neutral feedback, a Conversation may automatically be sent by the system to both members involved in the transaction. In some embodiments, both parties must agree to change the feedback rating from negative/neutral to positive in order for the change to be made.

In some embodiments, when a member finds an item or shop that they like, they may bookmark it by adding it to a list of Favorites. A member's Favorites list may be accessed at a later time to bring a member back to an item or store that they liked. In addition, members may subscribe to an RSS feed of a shop and be informed when new items are listed. RSS feeds may also be available for Favorites lists, Gift Guides, Alchemy transactions (discussed below), or any of a number of blogs conducted in the community. An RSS feed may provide a buyer notice of listing of new items similar to items which the member found attractive in the past, which may reduce a need of a member to actively search for such items.

In some embodiments, members may browse Favorites lists of other members. Features may be provided which may allow members to see who has added a certain item and/or shop to their Favorites list. For example, a link to a member's Favorites list may be provided in the member's profile page. This feature may be useful for members who have identified other members with similar tastes as their own. By viewing the Favorites list of a member with similar tastes, a member may discover online stores or items for sale which the member finds appealing but which the member was not previously aware of. Members may have the option of keeping their Favorites list private.

Additionally, in some embodiments, members may have the option of recommending items to other members on a "Treasury" web page. The Treasury may comprise a member-curated gallery of short-lived lists of, for example, 12 hand-picked items each. Members can feature their favorite items, items selected on a theme, or just who or whatever they like on a Treasury page. The Treasury may not be intended for self-promotion, but instead to acknowledge and share things for sale within the community which a member finds interesting. An administrator may choose an exceptional Treasury list to promote to a list of featured items listed on the Community homepage.

In some embodiments, members may also search for other member-recommended items using a "Connections" feature. The Connections feature may provide a way to browse items on other members' Favorites lists and for a member to see which other members have tastes similar to their own. The Connections feature may start by showing a few of a member's Favorite items. If the member selects an item, the Connections feature may show the member a list of other members who have added that item to their Favorites list. By clicking on or otherwise selecting an icon representing another member, a member may see a few, or all, of that other member's other Favorite items and/or shops.

In some embodiments, members may also search using a "Find User" function if there is a particular other member that they want to start with. This "Find User" function may be useful if a member has already identified one or more other members with whom the member shares similar tastes and the member would like to keep updated on what items or stores the one or more other members have added to their Favorites lists.

In some embodiments, the community may also include an "Alchemy" feature. This feature is described in co-pending U.S. patent application Ser. No. 12/017,501, entitled "METHOD AND APPARATUS FOR REQUESTING PRODUCTS" which is hereby incorporated by reference herein in its entirety. Alchemy is a feature where buyers can post requests for custom items and sellers can bid on the opportunity to make the item(s). In some embodiments, any member can make a request, since all members may be given "buyer" status upon joining the community. In some embodiments, only members who have signed up and approved to be sellers can place bids. There may be no fees for buyers to make Alchemy requests. A seller may make a bid on an Alchemy request, and once a bid is accepted and confirmed, the seller may be charged a transaction fee, for example a transaction fee equal to 3.5% of the price of the accepted bid. This fee may be higher or lower than 3.5% of the price of the accepted bid in different embodiments. Like Showcase fees, listing fees, and sales fees, this fee may be used to contribute operating funds for the maintenance of the community web site or compensation for administrators and operators of the web site.

In some embodiments, to place a request on the Alchemy system, a buyer may navigate to an Alchemy entry dialog or form on a web page of the online community. The buyer may then proceed to enter information such as a title of the request, a desired price (to which a seller may make counter offer), a desired quantity of items to be produced, a deadline when the buyer would like the items produced by, a detailed description of the item desired, including information such as color, size/measurements and any other relevant information, one or more tags describing the item desired, desired materials of construction, if any, images, such as sketches of the desired item, and a shipping address.

Once an Alchemy request is submitted by a buyer, sellers may submit bids to create the item(s) requested. A bid may outline a seller's offer, including the estimated price (which may be different than the ideal price in the request), shipping costs and terms, payment terms, and a detailed description of the item they would create for the buyer. Multiple sellers may bid on the same request. A Conversation may be sent to both the buyer and seller when a bid is placed.

After a bid has been placed, a buyer may accept, decline, or request changes to a bid. The buyer and the seller can communicate about changes by replying to a Conversation that was sent when the bid was placed. The seller can edit the bid at any time before it is accepted or declined by the buyer. A Conversation may be sent to both parties when the bid is accepted or declined, and the buyer may have the option to include a personalized message. A buyer may accept multiple bids on the same request, if the buyer would like items from different sellers.

Sometimes things may change in the time between a seller submitting a bid and a buyer accepting it. For this reason, once a bid is accepted by the buyer, the seller may be required to confirm that they are still available to make the item. Once a seller confirms they will make the item, the request/bid may become a recorded transaction. An invoice may appear on a Purchases page, like an invoice that may be generated by purchasing an item from a seller's online store.

By accepting and confirming a bid, both the buyer and the seller agree to follow through with the transaction.

Once the seller has confirmed the agreement, the buyer may submit payment according to the terms of the bid. The seller may send the buyer an invoice, which may be handled through email.

The seller may create the item and may upload images to show off the finished piece. Once the seller completes the Alchemy ticket, a listing may automatically be created in a "Sold Items" section of the seller's online shop, if the seller has one.

The seller may then ships the item(s) to the buyer at the address entered in the Alchemy request. Both parties can leave feedback for each other.

In some embodiments, users may link their community account to other social networking web sites, such as Facebook, MySpace, or Twitter. A "Facebook Connect" feature may be provided which allows members to link their Facebook account into the online community so they can share what they are doing on the online community with friends on Facebook. Similar features may be provided for linking members' online community accounts to other social networking web sites. Configuration options may be provided so that a member may control what information is shared.

Figure 17:
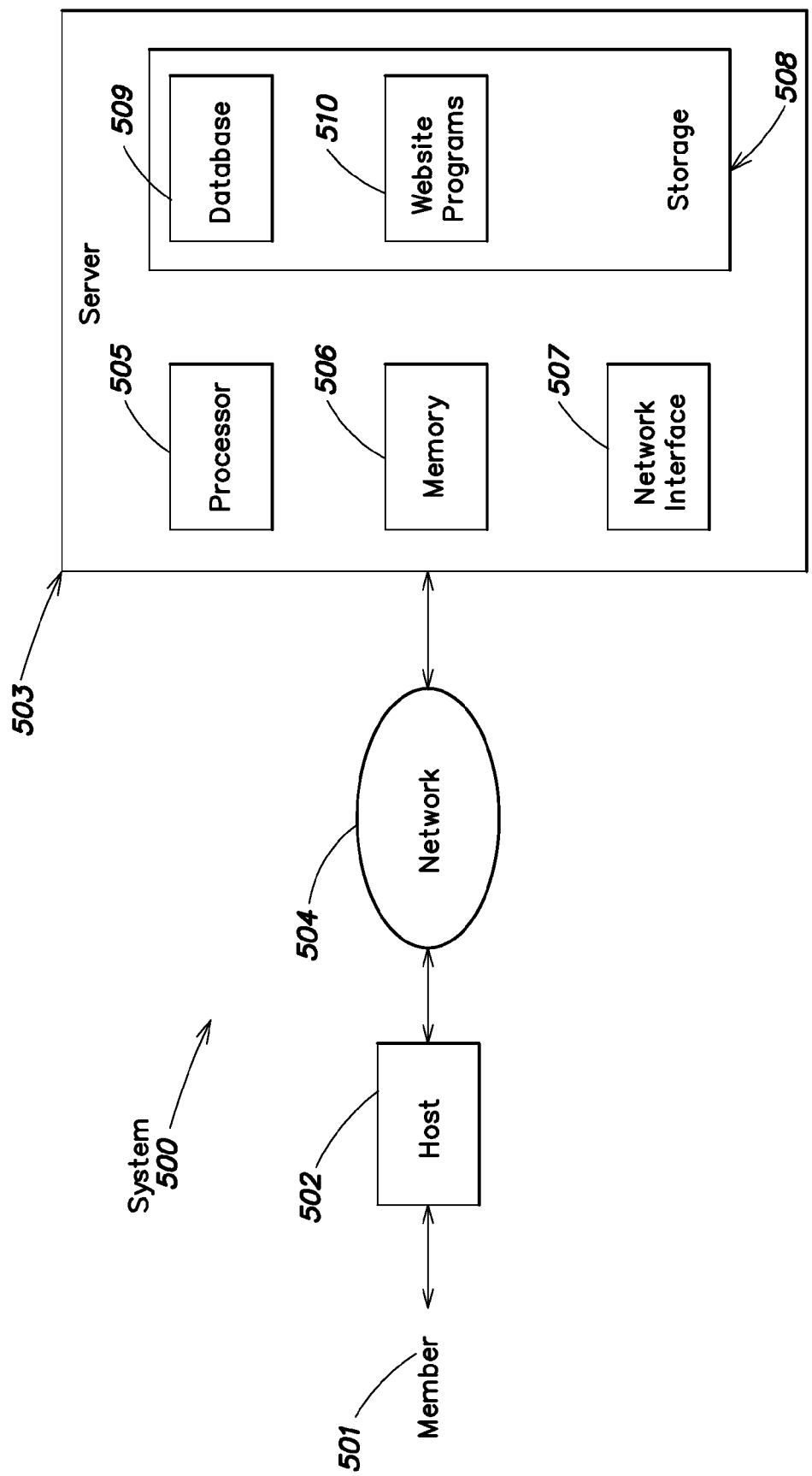
FIG. 17 is a schematic of an example architecture upon which embodiments of the present disclosure may be performed.

In some embodiments, the online community may be implemented upon a system 500 such as that illustrated in FIG. 17. A member 501 may utilize an interface of a host device 502 to access a server 503 though a network 504. The host device 502 may be a conventional personal computer, or may be a smartphone, netbook, or other device capable of electronically communicating to a server 503 over a communications network 504. In some embodiments, the communication network 504 may comprise the internet. Functions related to the operation of the online community may be performed on the server 503. The server 503 may include a network interface 507 for communicating with a host device 502. The server may include storage 508 including one or more memory systems to store information relating to the operations of the online community. For example, the memory may include a database 509 for storing records of transactions performed between members on the web sites of the community and/or store graphics and pricing data on items offered for sale by members of the community. The server may include a section of memory 510 to store programs used for example, to provide for the streaming video and avatar animation features of some portions of the online community. The server 503 may also include a processor 505 and short term memory 506, such as RAM, for running the various programs associated with the online community.

It should be appreciated that the various subsystems of the server 503 may be contained within a single server, or distributed among multiple servers which may communicate over a network. For example, Shop Live events may be streamed through a Flash Media server with data and/or instructions provided to the Flash Media server from another server, such as server 503. Distribution of data or processing functions across multiple serves may in some instances be desirable so that a power loss or fault at one server will not disrupt the entire online community. Replication of data across multiple servers may also allow for multiple members to simultaneously access the data without overloading a single server. It should also be appreciated that multiple members may utilize multiple host systems 502 to access the online community at once. Providing for multiple members to access the online community simultaneously permits for multiple members to interact with one another through the online community.

Figure 18:
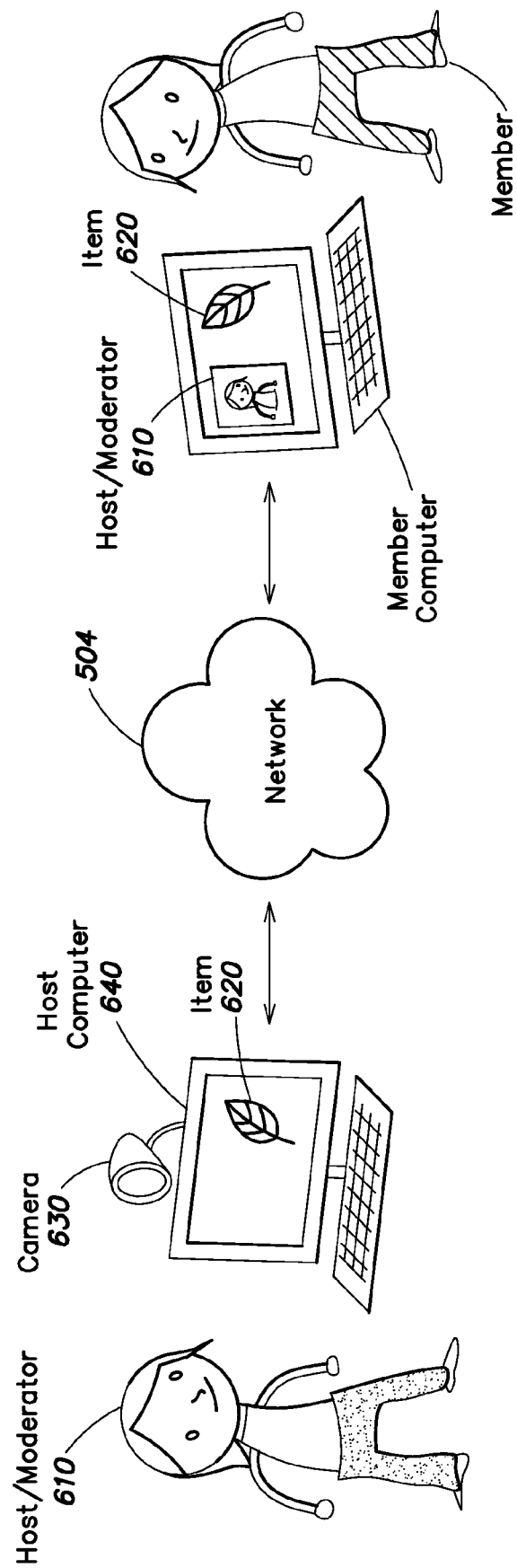
FIG. 18 is a schematic illustration of a portion of a system in which aspects of methods disclosed herein may be performed.

Shopping events, such as Shop Live events, may be performed with one or more moderators, hosts, administrators, or sellers located in any location such as a home studio, home, or office of a moderator, host, administrator, or seller such as that illustrated in FIG. 18. In other embodiments, the Shop Live events may be performed at a broadcast studio. A broadcast studio may be a studio dedicated to the broadcast of events associated with the online community.

In some embodiments, in the studio, an administrator, host, or moderator 610 may choose an item or multiple items 620 to present for display to members participating in a shopping event. The host or moderator 610 need not necessarily be the seller of the item 620, although in some embodiments, the host or moderator may promote items 620 from his or her own online store. The host or moderator 610 may host a shopping event including items based on a common theme and may present items from the online stores of multiple different sellers according to that theme.

In some embodiments, the administrator, host, or moderator 610 may broadcast a live audio and/or video feed of a presentation utilizing a camera 630. The camera 630 may be a video camera, a webcam, or any other form of camera capable of capturing and transmitting audio and/or video. A still camera may also be present in the studio for the capture and/or transmission of images of the administrator, host, or moderator. The camera 630 may communicate with a computer 640, which may in turn communicate with a network 504 for transmitting a broadcast sales pitch of the host or moderator 610. The camera 630 may in some embodiments communicate directly with the network 504.

Communications between the camera 630 and the computer 640 and/or the network 504 may be performed over wires or wirelessly, and may be performed over a LAN, WAN, dedicated connection, or other form of data transmission system that may be appreciated by one of ordinary skill in the art.

The computer 640 may be any form of computer or other electronic device capable of processing and transmitting the audio and video feed from the camera 630. For example, the computer 640 may be a general purpose computer including an interface for receiving data from the camera 630 and a network interface for transmitting a presentation from the host or moderator 610, and programmed with appropriate audio/video processing and/or transmission software. In some embodiments, the computer 640 may be the server 503 of FIG. 17.

The host or moderator 610 may be in the possession of the item(s) or still images of the item(s) 620 being promoted. These still images may be digitally stored in a memory of the computer 640 and/or may be digitally stored on the network 504. The host or moderator 610, or an assistant, may interact with an interface of the computer 640 to project still images of the product 620 or other products into a web page in which members of the online community may view the live presentation of the host or moderator 610.

In some embodiments, the host or moderator 610, or an assistant may produce and transmit still images of the item 620 or manipulate the item in a live video feed from the camera 630 in response to a request from a member viewing the presentation. Members attending the virtual presentation may communicate via text, audio, or video to the host or moderator 610 during the host or moderator's presentation. This communication may take place through an interface of the computer 640.

Figure 8:
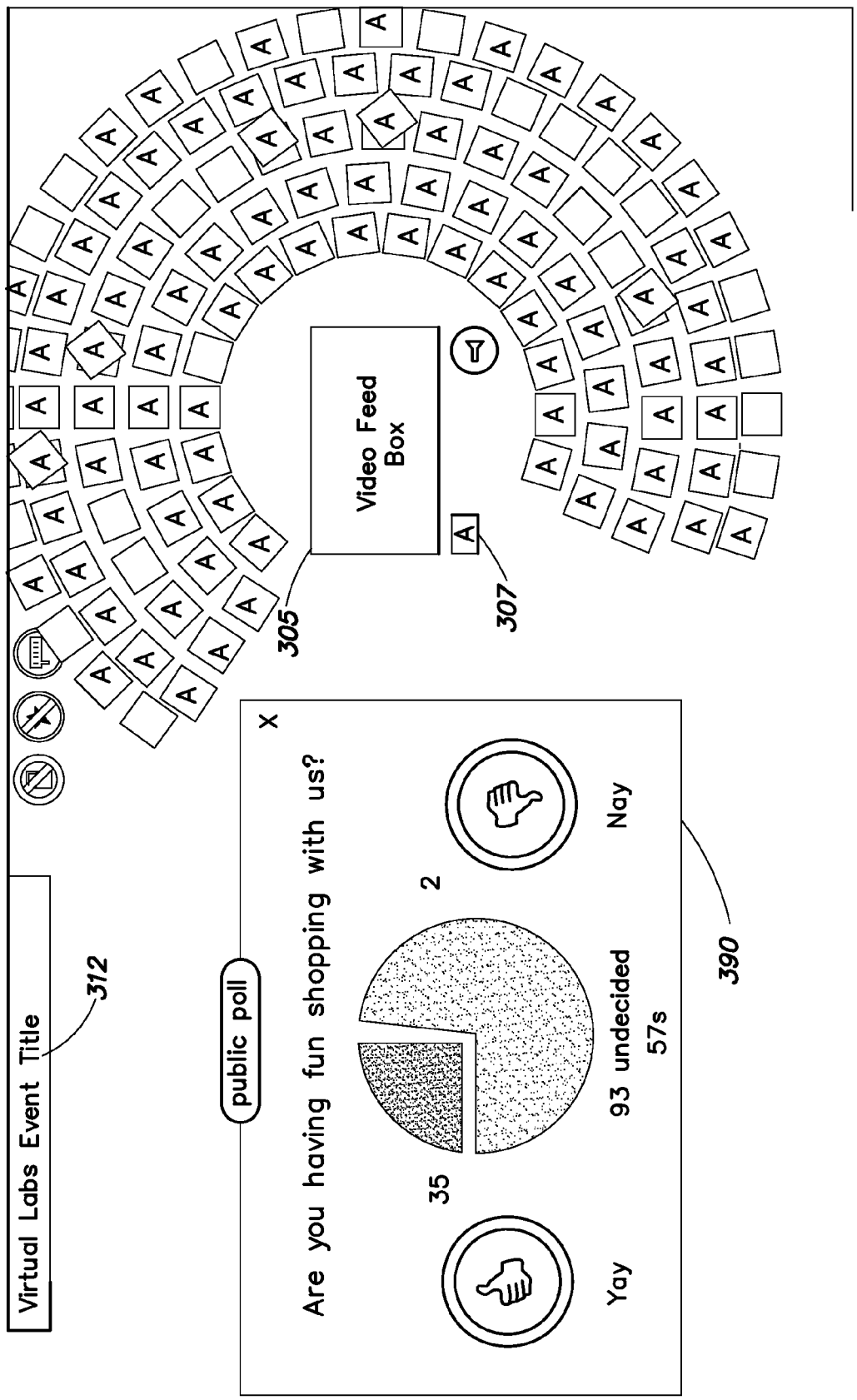
FIG. 8 illustrates another example portion of a web page for performing a transaction according to another embodiment.
Figure 9:
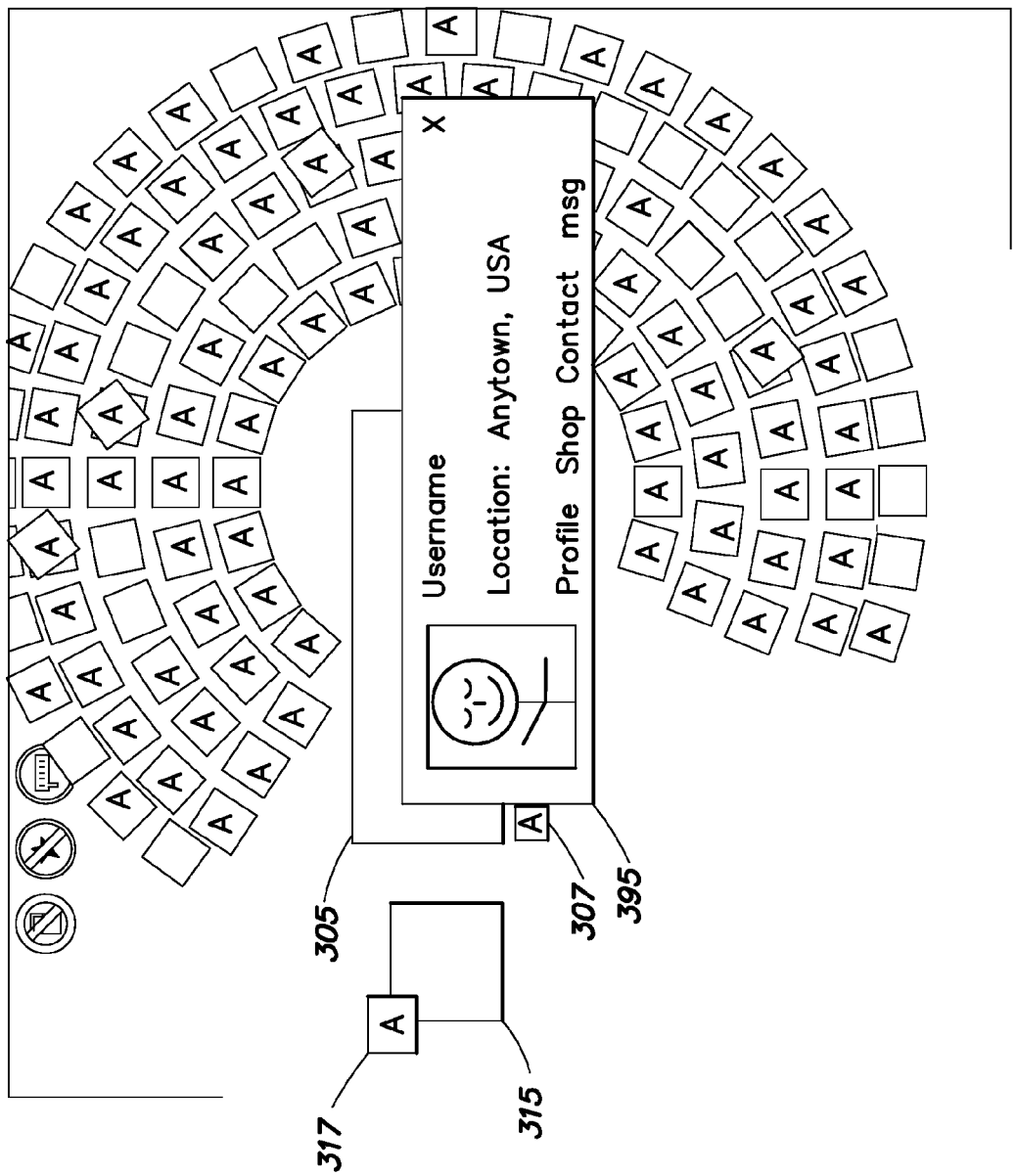
FIG. 9 illustrates another example portion of a web page for performing a transaction according to another embodiment.

The host or moderator 610 may also send polls to sellers, such as that illustrated in FIG. 8 through an interface of the computer 640.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of administering an online community, the method comprising:

creating, for display in a virtual event area, a plurality of designated graphical locations surrounding a live video presentation of a host promoting at least one product from at least one online store;

adding a plurality of users to the virtual event area, wherein a respective graphical avatar is added to a respective designated graphical location for each of the plurality of users;

creating, for display in the virtual event area, an image box of a product from a seller selected from the plurality of users, wherein the image box is appended with the graphical avatar for the seller and the image box contains at least an image of the product; and in response to receiving a selection of the product in the image box, creating a pop-up window for display in the virtual event area containing information on the product and functionality to add the product to a shopping cart;

wherein the aforementioned steps are performed by a computer processor.

2. The method of claim 1, further comprising transmitting instructions from a server of a computer system supporting the online community to a host device of one or more members of the online community to present a workshop room within the virtual event area and to display the live video presentation to one or more members of the online community who virtually enter the workshop room.

3. The method of claim 2, further comprising:

receiving instructions at the server from the host device to display, within the virtual event area, an indication of interaction of members of the online community who have entered the workshop room with one another through avatars associated with the members; and transmitting instructions from the server to the host device to display the indication of interaction within the virtual event area.

4. The method of claim 1, further comprising linking a community account of a member of the online community to a social networking web site wherein activity of the member within the community is displayed on the social networking web site.

5. The method of claim 1, further comprising:

receiving instructions transmitted from a host device of one or more members of the online community to a server of a computer system supporting the online community to schedule a time at which a live, interactive online event will occur; and scheduling the time at which the live, interactive online event will occur.

6. The method of claim 5, further comprising:

receiving instructions transmitted from the host device to the server to insert a second image of an item onto a web page upon which the interactive event is displayed; and inserting the image of the second item onto the web page upon which the interactive event is displayed.

7. The method of claim 1, further comprising assigning an avatar to a member of the online community.

8. The method of claim 1, further comprising:

receiving a signal from a host device of one or more members of the online community at a server of a computer system supporting the online community, the signal including an indication of a member of the online community clicking on the image box during the live end video presentation; and displaying information regarding the product in the virtual event area.

9. The method of claim 1, further comprising:
receiving instructions transmitted from a host device of one or more members of the online community to a server of a computer system supporting the online community to post questions to a question queue accessible by the host, and;
posting the questions to the question queue.

10. The method of claim 9, further comprising:
receiving instructions from the host device at the server to display a response to a posted question in a user interface of the host device during the live video presentation;
transmitting instructions from the server to the host device to display the response in the user interface of the host device during the live video presentation; and
displaying the response in the user interface of the host device during the live video presentation.

11. The method of claim 2, further comprising:
receiving instructions from the host device at the server to remove a member of the online community from the workshop room; and
removing the member of the online community from the workshop room.

12. The method of claim 2, further comprising:
receiving instructions from the host device at the server to prevent members of the online community from virtually entering the workshop room; and
preventing members of the online community from virtually entering the workshop room.

13. The method of claim 1, further comprising:
receiving instructions from a host device of one or more members of the online community at a server of a computer system supporting the online community to alter an appearance of a virtual workshop room in which the live video presentation is displayed; and
altering the appearance of the virtual workshop room in which the live video presentation is displayed.

14. The method of claim 1, further comprising:
receiving instructions from a host device of one or more members of the online community at a server of a computer system supporting the online community to record a transcript of the live video presentation; and
recording a transcript of the live video presentation.

15. The method of claim 14, further comprising:
receiving instructions from the host device at the server to display the transcript through an interface of the host device at a time after the live video presentation has been performed; and
displaying the transcript through the interface of the host device at the time after the live video presentation has been performed.

16. The method of claim 1, further comprising transmitting instructions from a server of a computer system supporting the online community to a host device of one or more members of the online community to display a web page in a user interface of the host device and to display the live video presentation in the web page.

17. The method of claim 16, further comprising transmitting instructions from the server to the host device to present a poll on the web page during the display of the live video presentation, the poll being configured to obtain feedback about the product from the at least one member of the online community.

18. The method of claim 17, further comprising transmitting instructions from the server to the host device to present results of the poll in real time on the web page using at least one graphical indicator.

19. The method of claim 1, wherein the at least one online store is curated by a member of the online community.

* * * * *

UNITED STATES PATENT AND TRADEMARK OFFICE
CERTIFICATE OF CORRECTION

PATENT NO. : 8,924,261 B2  
APPLICATION NO. : 12/609355  
DATED : December 30, 2014  
INVENTOR(S) : Matthew Stinchcomb Page 1 of 1

It is certified that error appears in the above-identified patent and that said Letters Patent is hereby corrected as shown below:

In the Specification:

At Column 4, line number 7, insert --at-- between "item" and "at".

Signed and Sealed this  
Thirty-first Day of March, 2015

Michelle K. Lee  
*Director of the United States Patent and Trademark Office*